United States Patent
Yamamoto

[19]

[11] Patent Number: 6,023,055
[45] Date of Patent: *Feb. 8, 2000

[54] APPARATUS FOR HEATING PREPACKAGED FOODS UTILIZING HIGH FREQUENCY HEATING WITH ELECTRODES IN A SEALED CHAMBER

[75] Inventor: Yasuji Yamamoto, Osaka, Japan

[73] Assignee: Yamamoto Vinita Co., Ltd., Oskak-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/877,670

[22] Filed: Jun. 17, 1997

[51] Int. Cl.[7] .............................. H05B 6/54; H05B 6/60
[52] U.S. Cl. .................... 219/771; 219/775; 219/777; 219/780; 426/241; 99/358; 99/451; 422/23
[58] Field of Search .................... 219/771, 777, 219/780, 775, 684, 686, 700, 701; 426/241, 243, 244; 99/451, 358; 422/21, 22, 23

[56] References Cited

U.S. PATENT DOCUMENTS

| | | |
|---|---|---|
| 2,807,698 | 9/1957 | Pircon .................................... 219/771 |
| 3,494,724 | 2/1970 | Gray . |
| 3,889,009 | 6/1975 | Lipoma . |
| 3,961,569 | 6/1976 | Kenyon et al. . |
| 4,303,820 | 12/1981 | Stottmann et al. ...................... 219/771 |
| 4,812,609 | 3/1989 | Butot ...................................... 219/771 |
| 4,974,503 | 12/1990 | Koch ....................................... 99/451 |
| 5,069,920 | 12/1991 | Hildebrand .............................. 426/234 |
| 5,334,402 | 8/1994 | Ovadia .................................... 426/241 |

FOREIGN PATENT DOCUMENTS

| | | |
|---|---|---|
| 128397 | 12/1984 | European Pat. Off. . |
| 136453 | 4/1985 | European Pat. Off. . |
| 269073 | 6/1988 | European Pat. Off. . |
| 344408 | 12/1989 | European Pat. Off. . |
| 347623 | 12/1989 | European Pat. Off. . |
| 2107424 | 5/1972 | France . |
| 2547732 | 12/1984 | France . |
| 731272 | 2/1943 | Germany . |
| 1226249 | 10/1966 | Germany . |
| 218 943 | 2/1985 | Germany .............................. 219/771 |
| 3612606 | 2/1988 | Germany . |
| 610520 | 10/1948 | United Kingdom . |

*Primary Examiner*—Philip H. Leung
*Attorney, Agent, or Firm*—Jordan and Hamburg LLP

[57] ABSTRACT

A heating apparatus for heating a prepackaged food, is provided with a heater which heats a prepackaged food, an enclosure which defines an airtight chamber operable to accommodate the prepackaged food, and a pressure controller which controls the inside pressure of the airtight chamber. The heater includes a pair of electrodes which are arranged face to face, and an electric power source which supplies a high frequency electric power. The inside pressure of the airtight chamber is controlled in response to an expansion of the prepackaged food being heated to prevent the packaging container from breaking out.

29 Claims, 13 Drawing Sheets

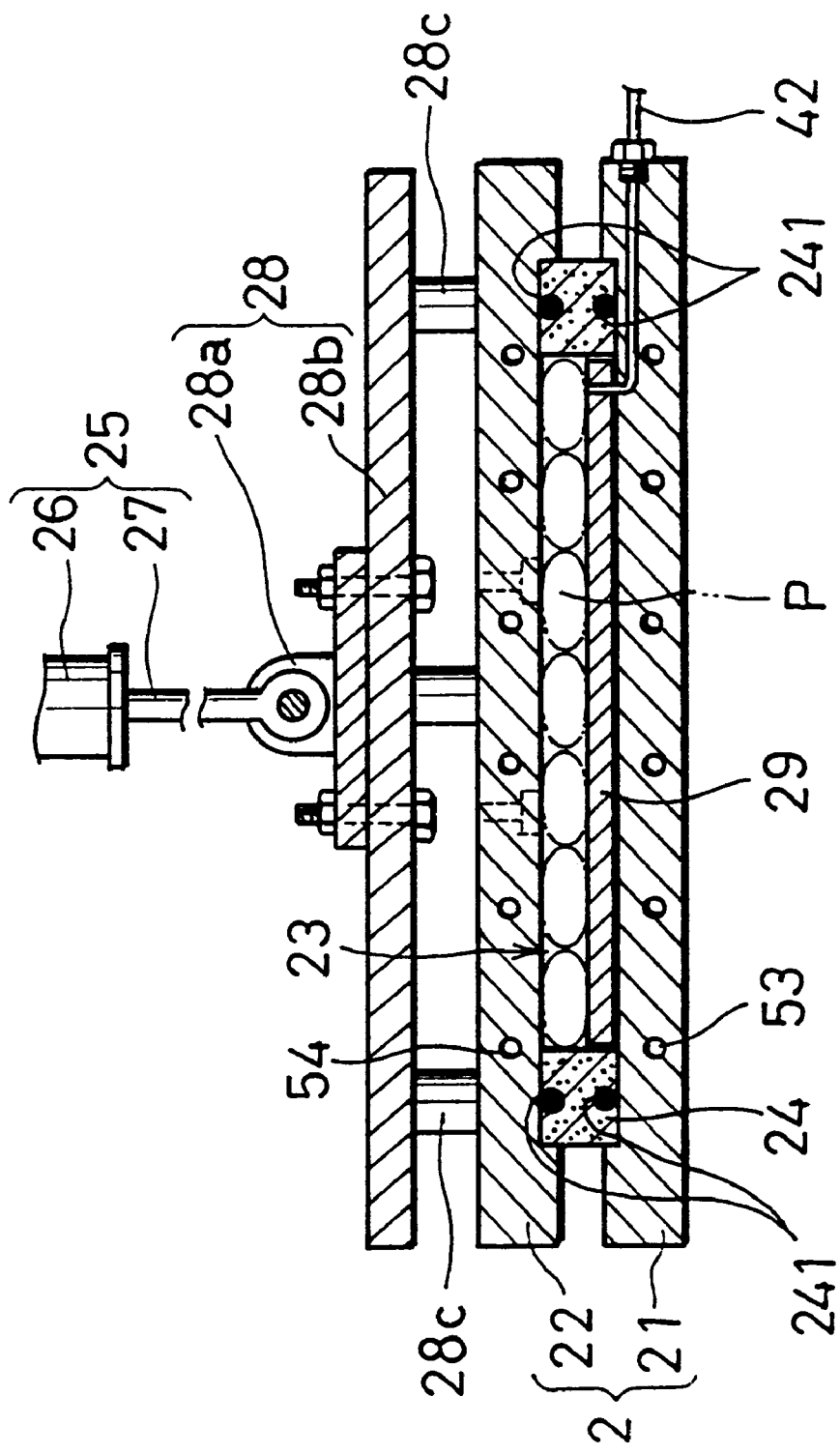

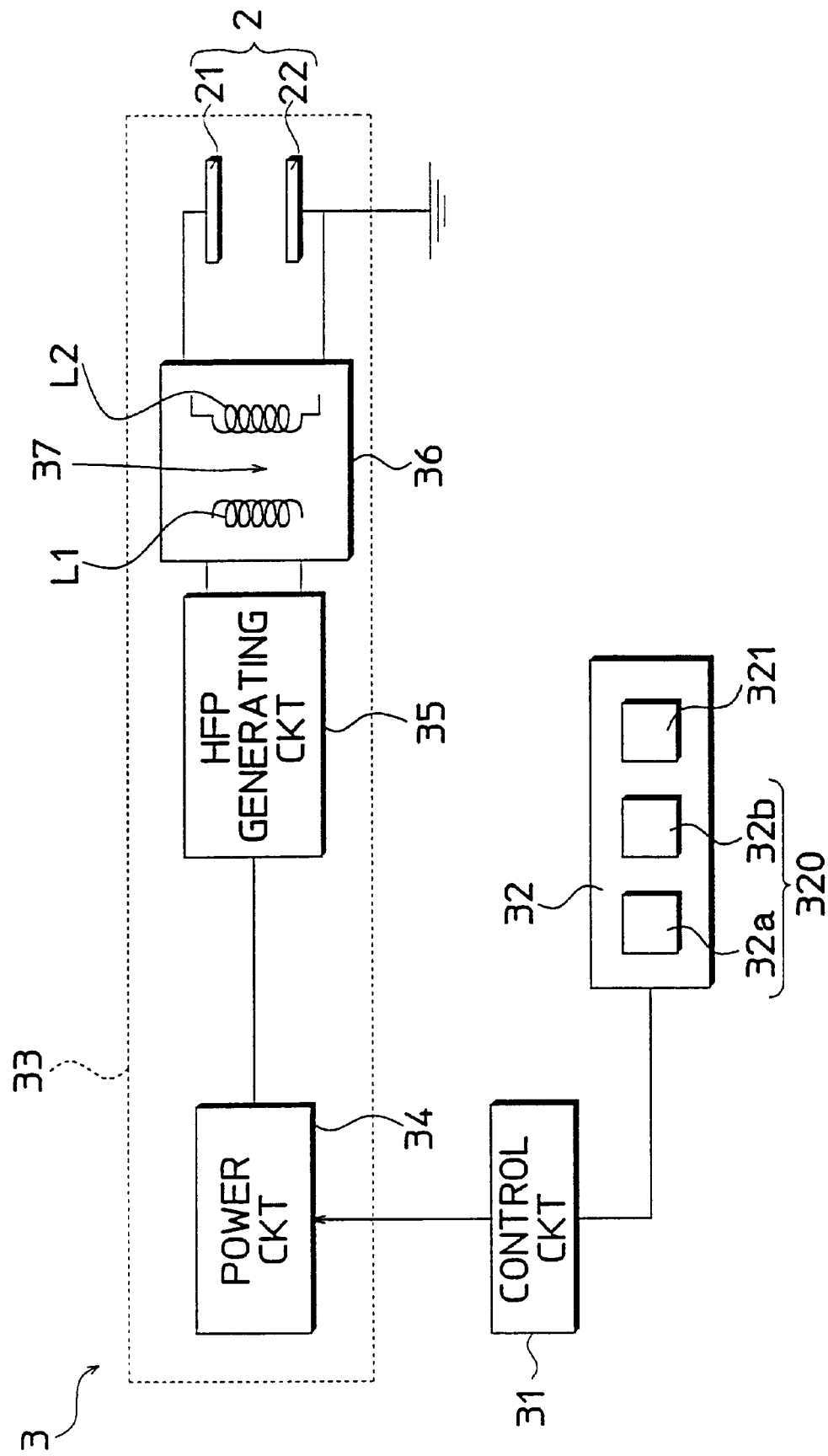

APPARATUS FOR HEATING PREPACKAGED FOODS UTILIZING HIGH FREQUENCY HEATING WITH ELECTRODES IN A SEALED CHAMBER

BACKGROUND OF THE INVENTION

This invention relates to a heating apparatus for heating a so-called prepackaged food in which a cooked, semi-cooked or non-cooked food is sealed in a plastic packaging such a plastic bag or plastic tray.

A prepackaged food in which food is sealed in a plastic packaging container such as a plastic bag or plastic tray is heated for cook or for sterilization.

Heat sterilization is applied to cooked or semicooked food already filled in the packaging container before shipment. Boiling and steaming are generally used as heat sterilization means. In recent years, further, in order to suppress the degradation of tastes and flavors of foods and improve the quality thereof by shortening the heat sterilization time, high frequency dielectric heat sterilization and microwave heat sterilization have been proposed.

In such heating of prepackaged foods, there has been a problem that the inside volume of a packaging container covering food increases as the food is heated, consequently breaking out the packaging container before the temperature of the food reaches a specified temperature, e.g., 100° C. or higher, desirably 120 to 140° C. in heat sterilization, resulting in failure of necessary heating of the prepackaged food.

SUMMARY OF THE INVENTION

It is an object of the present invention to provide an apparatus for heating prepackaged food which has overcome the problems residing in the prior art.

According to an aspect of the present invention, a heating apparatus for heating a prepackaged food, comprising: a heater which heats a prepackaged food; an enclosure which defines an airtight chamber operable to accommodate the prepackaged food; and a pressure controller which controls the inside pressure of the airtight chamber.

The inside pressure of the airtight chamber is controlled in response to an expansion of the prepackaged food being heated to prevent the packaging container from breaking. Accordingly, the food can be heated to a necessary temperature without the likelihood that the packaging container breaks up.

These and other objects, features and advantages of the present invention will become more apparent upon a reading of the following detailed description and accompanying drawings.

BRIEF DESCRIPTION OF THE DRAWINGS

FIG. 3 is a view of a section taken along the line III—III of FIG. 2;

FIG. 4 is a block diagram of a high frequency generating unit;

DETAILED DESCRIPTION OF THE PREFERRED EMBODIMENTS OF THE INVENTION

Figure 1:
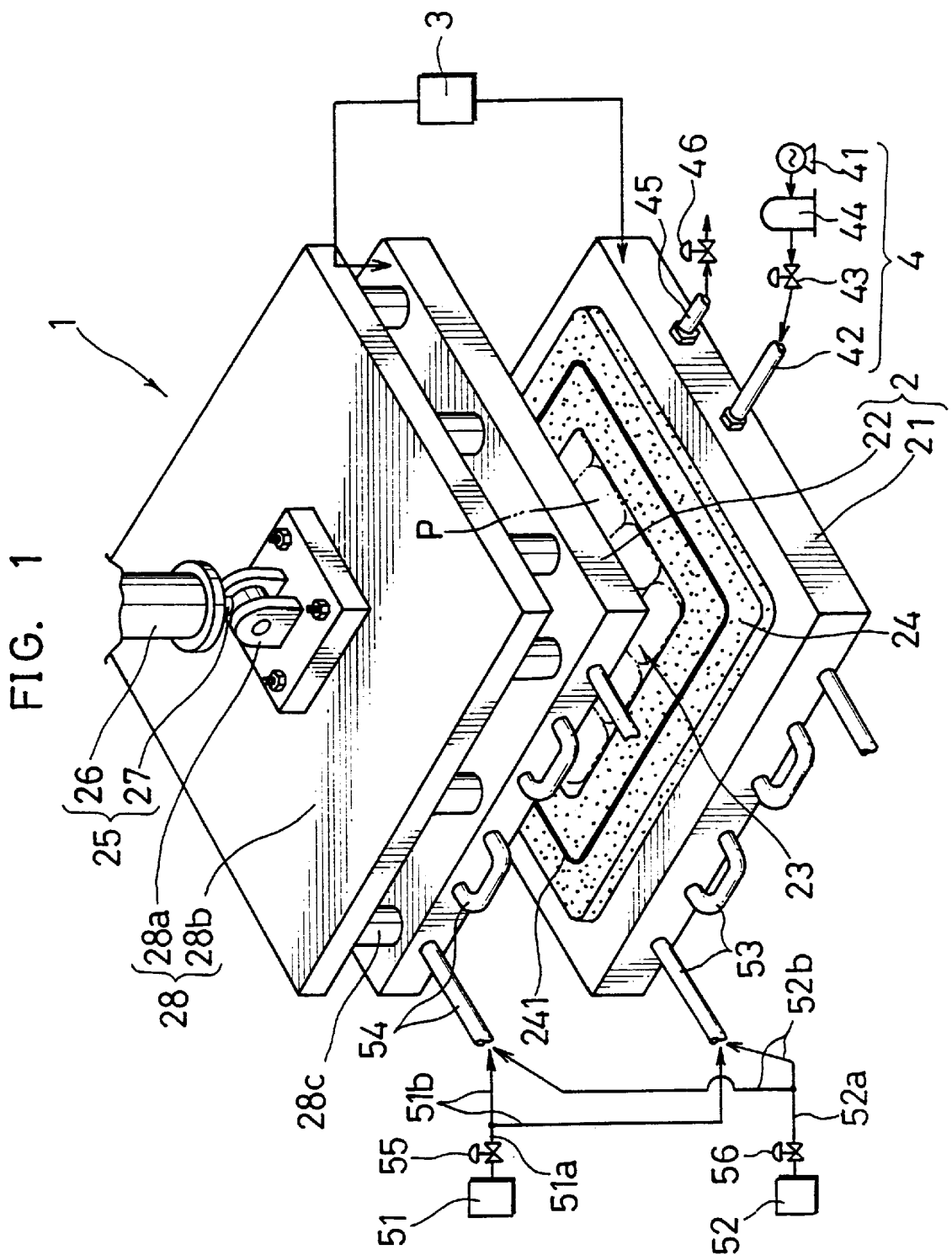
FIG. 1 is a perspective view of a first high frequency sterilizing apparatus embodying the invention, a lid of a container main body being opened.
Figure 2:
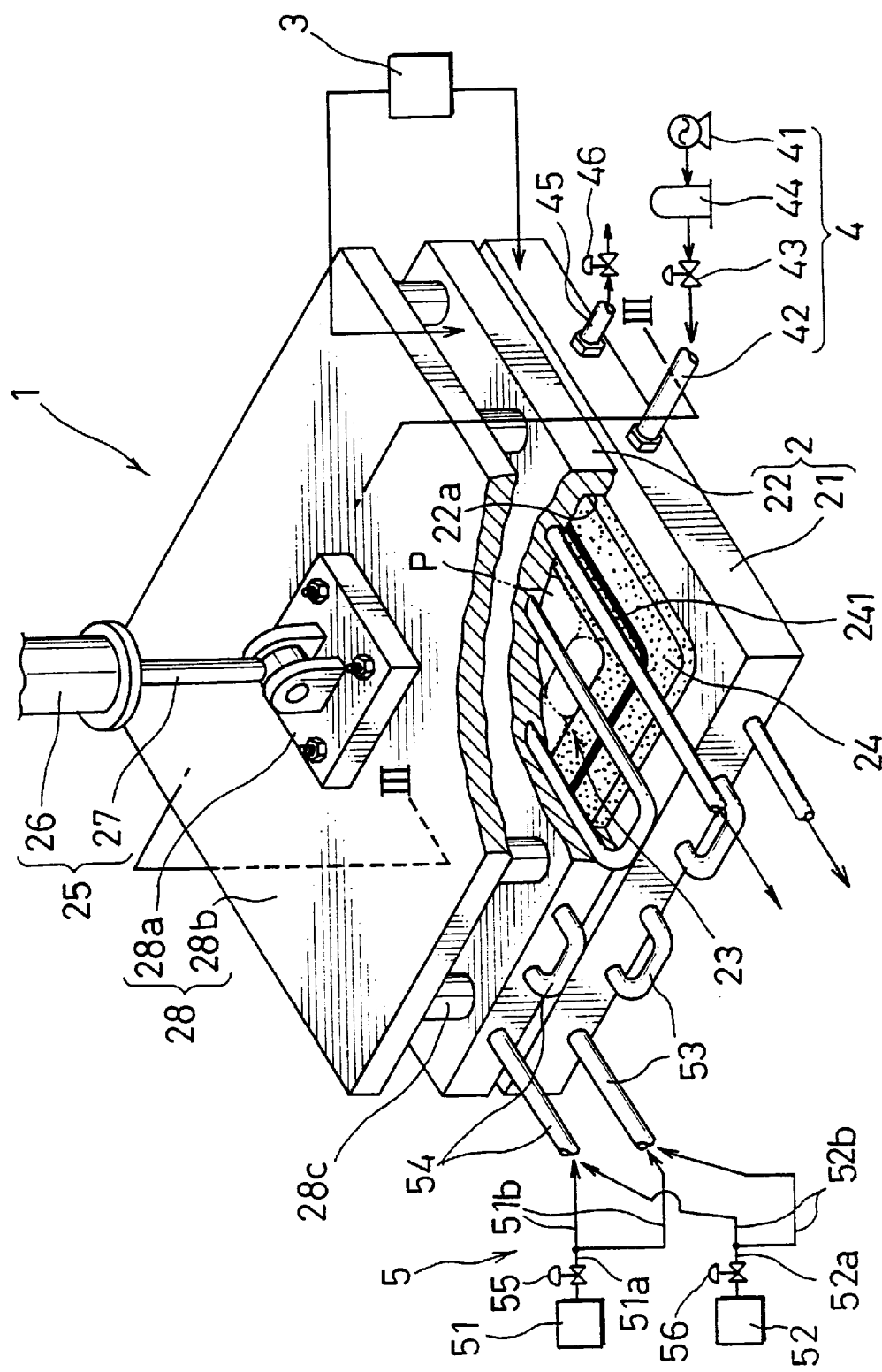
FIG. 2 is a perspective view partly cut away showing a state where the container main body of the high frequency sterilizing apparatus of FIG. 1 is closed by the lid.

FIG. 1 is a perspective view of a first high frequency sterilizing apparatus embodying the invention, wherein a lid of a container main body is opened; FIG. 2 is a perspective view partly cut away showing a state where the container main body of the high frequency sterilizing apparatus of FIG. 1 is closed by the lid; and FIG. 3 is a view of a section taken along the line III—III of FIG. 2. As shown in FIGS. 1 to 3, a high frequency sterilizing apparatus 1 is provided with a food sterilization container (sealed container) 2 for containing sealed prepackaged foods P, a high frequency electric power generating unit 3 for applying a high frequency electric power to the sealed prepackaged foods P within the food sterilization container 2, a pressurizing unit (pressure controller) 4 for pressurizing the inside of the food sterilization container 2 and a temperature adjusting unit 5 for adjusting the temperature of the food sterilization container 2.

The food sterilization container 2 includes a container main body 21 of metal which has a square shape when viewed from front and a lid 22 of metal corresponding to the container main body 21. In the center of the surface of the container main body 2 is formed a square recess having a flat bottom surface. This recess forms a sterilization chamber 23 for accommodating the sealed prepackaged foods P. In the first embodiment, the container main body 21 and the lid 22 are used as lower and upper electrodes of the high frequency electric power generating unit 3. High frequency electric power of several MHz to several hundreds of MHz can be used. However, in this embodiment, high frequency electric power of 3 MHz to 300 MHz is used.

A hollow square seal member (side wall member) 24 is sealably mounted on the inner side surfaces of the sterilization chamber 23. The seal member 24 used in this embodiment is made of polytetrafluorethylene which has an excellent heat resistance and is very tough. The height of the seal member 24 is set larger than the depth of the sterilization chamber 23, so that an upper portion of the seal member 24 mounted in the sterilization chamber 23 projects upward from the edge of the sterilization chamber 23. An O-ring 241 of synthetic resin (see FIG. 3) is provided in the widthwise center of each of the front and rear surfaces of the seal member 24 in order to improve a sealing effect within the sterilization chamber 23.

The lid 22 has a projecting edge portion 22a projecting downward at its periphery. This projecting edge portion 22a is fitted around the portion of the seal member 24 projecting upward from the sterilization chamber 23 in sliding contact therewith, and a ceiling portion of the lid 22 comes into contact with the upper surface of the seal member 24 via the O-ring 241 when the projecting edge portion 22a is fitted around the seal member 24.

Accordingly, if the upper opening of the container main body 21 is closed by the lid 22 by fitting the projecting edge portion 22a around the seal member 24, the upper surface of the seal member 24 comes into contact with the ceiling portion of the lid 22 with the O-ring 241 being flattened. By this sealing effect, the sterilization chamber 23 is sealed against the outside and the container main body 21 and the lid 22 are electrically insulated to each other. Since the O-ring 241 comes into contact with the ceiling portion of the lid 22 even if the seal member 24 does not come into contact therewith, the sealing effect is not hindered.

The depth of the sterilization chamber 23 is set such that the surfaces of the sealed prepackaged foods P come into contact with the ceiling surface of the lid 22 when the sealed prepackaged foods P are arrayed in vertical and horizontal rows in the container main body 21 as shown in FIG. 2 and the upper opening of the container main body 21 is closed by the lid 22 as shown in FIG. 1.

In the case that the thickness of the sealed prepackaged foods P is small and the surfaces thereof cannot be in contact with the ceiling surface of the lid 22 when being placed in the sterilization chamber 23, a compensation plate 29 of a metal material such as aluminum is provided at the bottom of the container main body 21 so as to compensate for a difference between the thickness of the sealed prepackaged foods P and the depth of the sterilization chamber 23. If there are prepared a plurality of kinds of compensation plates 29 having different values of thickness, a plurality of kinds of sealed prepackaged foods P can be handled by exchanging the compensation plates 29.

In this embodiment, a pressing device 25 is provided on the upper surface of the lid 22. This pressing device 25 presses the lid 22 downward so as to securely seal the sterilization chamber 23. Specifically, the pressing device 25 includes a hydraulic cylinder 26 hanging right above the center of the lid 22 and supported on an unillustrated support frame and a piston rod 27 projecting downward from the hydraulic cylinder 26. A bottom end of the piston rod 27 is connected with a connection member 28 secured to the lid 22, and the projection and retraction of the piston rod 27 driven by the hydraulic cylinder 26 are transmitted to the lid 22 via the connection member 28. In this embodiment, sealing means according to the invention is constructed by the pressing device 25 and the seal member 24.

The connection member 28 comprises a square-shaped connection plate 28a which is substantially as large as the lid 22 and a bracket 28b projecting from a center portion of the upper surface of the connection plate 28a. An upper part of the bracket 28b is forked. The piston rod 27 and the connection member 28a are coupled with each other by horizontally inserting a shaft into the bracket 28b with the leading end of the piston rod 27 tightly held between the projecting upper ends of the bracket 28b.

A specified number of cylindrical insulation members 28c are provided between the bracket 28b and the lid 22, so that the pressing device 25 and the lid 22 are coupled while being electrically insulated to each other. In this embodiment, the cylindrical insulation members 28c are made of a polyacetal resin or silicone resin.

The pressurizing unit 4 includes a pressure pump 41 for discharging a sucked outside air after compressing it, a high pressure pipe 42 provided between the pressure pump 41 and the container main body 21, a first control valve 43 provided in the high pressure pipe 42 and a high pressure tank 44 provided between the first control valve 43 and the pressure pump 41.

In the high pressure tank 44, a compressed air of predetermined specified pressure is constantly filled by driving the pressure pump 41. When the air of specified pressure is filled in the high pressure tank 44, the pressure pump 41 is automatically stopped by a feedback control. Accordingly, the air of specified pressure is admitted into the sterilization chamber 23 via the high pressure pipe 42 by opening and closing the first control valve 43.

Further, the container main body 21 is provided with an air vent pipe 45 a base end of which communicates with the sterilization chamber 23 and a leading end of which is open to an outside air. A second control valve 46 is provided in an intermediate position of the air vent pipe 45. Accordingly, the sterilization chamber 23 sealed by closing the lid 22 with respect to the container main body 21 communicates with the outside by opening the second control valve 46, releasing the sealed state.

The temperature adjusting unit 5 includes a steam generator (auxiliary heater) 51 such as a boiler, a coolant supply source (cooler) 52 such as water and sewage works, a first temperature adjusting pipe 53 provided inside the container main body 21 in a winding manner to adjust the temperature of the container main body 21, and a second temperature adjusting pipe 54 provided inside the lid 22 in a winding manner to adjust the temperature of the lid 22.

The steam generator 51 has a steam supply main pipe 51a for supplying a generated steam. A downstream end of the steam supply main pipe 51a is branched into two steam supply branch pipes 51b which are connected with an upper stream end of the first temperature adjusting pipe 53, respectively. Further, an upstream end of a coolant supply main pipe 52a is connected with the coolant supply source 52, and a downstream end thereof is branched into two coolant supply branch pipes 52b, the downstream ends of which are connected with the first and second temperature adjusting pipes 53 and 54, respectively. Unillustrated flexible tubes of synthetic resin are provided in specified positions of the steam supply branch pipes 51b and the coolant supply branch pipes 52b, so that the upstream sides of these branch pipes 51b, 52b toward the flexible tubes are insulated from the food sterilization container 2.

A third control valve 55 is provided in the steam supply main pipe 51a, and a fourth control valve 56 is provided in the first temperature adjusting pipe 53. By opening and closing the control valves 55, 56, steam from the steam generator 51 and coolant from the coolant supply source 52 are supplied to the respective temperature adjusting pipes 53, 54. In this way, the temperature of the food sterilization container 2, i.e., the temperature of the sealed prepackaged foods P placed in the sterilization chamber 23 can be adjusted.

Downstream ends of the first and second temperature adjusting pipes 53, 54 are opened ends which are open to the outside. The steam and coolant supplied to these temperature adjusting pipes 53, 54 are discharged to the outside of the sterilizing apparatus after being used for the temperature adjustment of the food sterilization container 2.

FIG. 4 is a block diagram of a high frequency electric power generating unit. As shown in FIG. 4, the high frequency electric power generating unit 3 includes a control circuit 31 for centrally controlling the high frequency sterilizing apparatus 1, an operation unit 32 for inputting various operation data to the control circuit 31 and a high frequency electric power generating device 33 for supplying a high frequency electric power to the pair of opposed electrodes 2.

The control circuit 31 controls the supply of power to the high frequency electric power generating device 33 based on the operation data inputted via the operation unit 32. In the operation unit 32, there are provided operation buttons 320 including a start button 32a, a stop button 32b and the like and data input keys 321 for inputting the kind, weight and other necessary information of the sealed prepackaged foods P.

Operation signals from the start button 32a and the stop button 32b are outputted to a power source circuit 34 as control signals via the control circuit 31. When the start button 32a is operated, the operation of the high frequency electric power generating device 33 is started. When the stop bottom 32b is operated, the operation of the high frequency electric power generating device 33 is stopped.

The high frequency electric power generating device 33 includes the power source circuit 34, a high frequency electric power generating circuit 35 for generating high frequency electric power upon the receipt of power from the power source circuit 34, and an interface circuit 36 provided at a downstream side of the high frequency electric power generating circuit 35. The power source circuit 34, for example, converts a commercial power source of 220V into a direct current source of specified level. The high frequency electric power generating circuit 35 is of self-oscillation type which generates high frequency energy of specified level upon the receipt of a dc voltage of specified level from the power source circuit 34. The interface circuit 36 is a circuit interfacing the high frequency electric power generating circuit 35 and a load (sealed prepackaged foods P) passing between the pair of opposed electrodes 2, and comprises a transformer 37 and an unillustrated interface capacitor.

Based on the kind, quantity and thickness of the sealed prepackaged food P, the control circuit 31 can set a power supply amount empirically obtained beforehand. This setting is done using the data input keys 321. When there is an input from the data input keys 321, an output power of the power source circuit 34 is set in accordance with a prestored calculation program.

The control circuit 31 individually controls a supply of the power calculated and set based on the kind, weight and other data of the sealed prepackaged foods P which are inputted from the data input keys 321 to the opposed electrodes 2. In this embodiment, the power from the power source circuit 34 can be supplied to the high frequency electric power generating circuit 35 while adjusting it by intermittently driving the power source circuit 34. Accordingly, by controlling one or both of a driving time and a driving frequency per unit time, the calculated and set power can be supplied to the high frequency electric power generating circuit 35.

In the case of intermittently supplying the high frequency electric power as above, if the driving time and an interrupted time are both set, for example, at about 5 sec., the heat given during the driving time is diffused during the interrupted time. Accordingly, a temperature distribution can be made uniform, i.e., uniform heating can be performed.

Figure 5A:
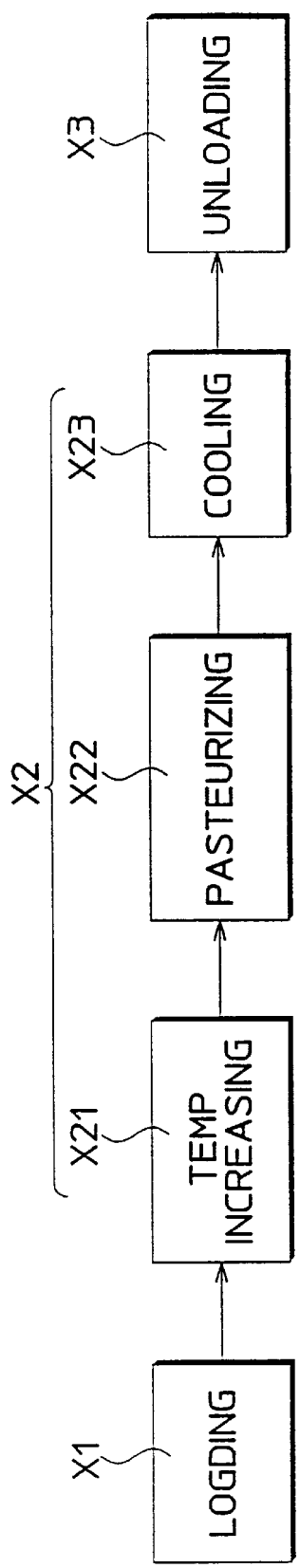
FIGS. 5A and 5B are diagrams showing a heat sterilization performed using the first high frequency sterilizing apparatus, FIG. 5A showing a heat sterilization process, FIG. 5B showing a temperature change of a sealed prepackaged food contained in a food sterilization container over time in the respective operation steps.
Figure 5B:
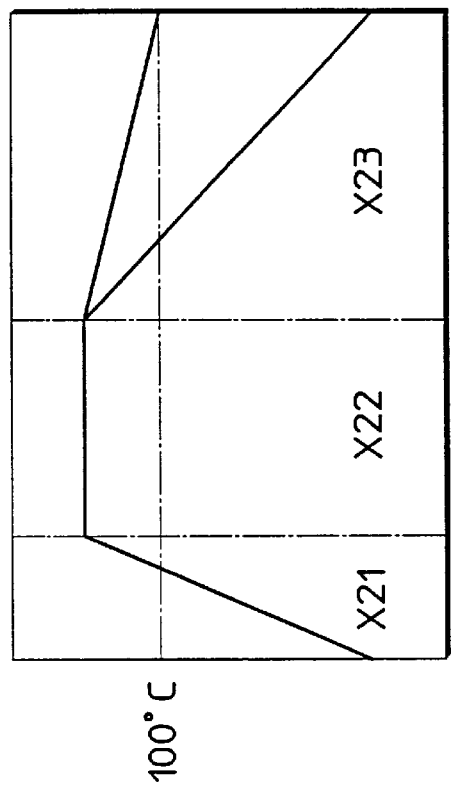

FIGS. 5A and 5B are diagrams showing a heat sterilization performed using the high frequency sterilizing apparatus, wherein FIG. 5A shows a heat sterilization process and FIG. 5B is a graph showing a temperature change of the sealed prepackaged foods contained in the food sterilization container over time in the respective operation steps. As shown in FIG. 5A, the heat sterilization is performed by a loading step X1 for loading the sealed prepackaged foods P in the sterilization chamber 23 of the food sterilization container 2, a sterilizing step X2 for heating the sealed prepackaged foods P loaded in the sterilization chamber 23 and an unloading step X3 for unloading the sealed prepackaged foods P upon the completion of the heat sterilization in the sterilizing step X2.

In the sterilizing step X2, there are successively performed a temperature increasing step X21 for increasing the temperature of the sealed prepackaged foods P to a sterilization temperature of 100° C. or higher, a sterilizing step X22 for performing a heat sterilization by holding the sterilization temperature of the sealed prepackaged foods P increased in the temperature increasing step S21 for a predetermined time, and a cooling step X23 for cooling the sealed prepackaged foods P after the sterilization for the predetermined time substantially to an ordinary temperature. In the cooling step X23, as indicated by an upper temperature curve of FIG. 5B, the sealed prepackaged foods P are at least cooled to 100° C. In some cases, as indicated by a lower temperature curve of FIG. 5B, the sealed prepackaged foods P are forcibly cooled to an ordinary temperature. The cooling of the sealed prepackaged foods P is suitably set between the upper and lower temperature curves according to given conditions.

First, in the loading step X1, the sealed prepackaged foods P are loaded in the sterilization chamber 23 of the container main body 21. During this operation, the respective sealed prepackaged foods P are arrayed in horizontal and vertical rows at the bottom of the sterilization chamber 23. Thereafter, the piston rod 27 is lowered by driving the hydraulic cylinder 26 to lower the lid 22. As a result, the upper opening of the sterilization chamber 23 is closed.

While the upper opening of the sterilization chamber 23 is closed, the projecting edge portion 22a of the lid 22 is fitted around the peripheral edge portions of the seal member 24 and the ceiling surface is in pressing contact with the upper surface of the seal member 24. Accordingly, the sterilization chamber 23 is securely sealed. Further, in this state, the front and rear surfaces of the sealed prepackaged foods P loaded in the sterilization chamber 23 are in contact with the ceiling surface of the lid 22 and the bottom surface of the container main body 21, respectively. In the loading step X1, the third control valve 55 is held open so that the heating of the food sterilization container 2 by the steam from the steam generator 51 is continued.

Subsequently, the sterilizing step X2 is performed. First, in this step X2, the first control valve 43 is opened to admit the compressed air from the high pressure tank 44 into the sterilization chamber 23, with the result that the sterilization chamber 23 is held at a specified high pressure (for example, 2 to 5 atm). The first control valve 43 is closed when a specified highly pressurized state of the sterilization chamber 23 is obtained. The sterilization chamber 23 is brought into the highly pressurized state in order to prevent the packaging containers of the sealed prepackaged foods P from being broken or torn due to the expansion of air inside the heated sealed prepackaged foods P.

After the specified highly pressurized state of the sterilization chamber 23 is obtained, the high frequency electric power generating unit 3 is driven in the temperature increasing step X21 to supply the high frequency electric power from the high frequency electric power generating circuit 35 between the opposed electrodes 2 constructed by the container main body 21 and the lid 22. As a result, the temperature of the sealed prepackaged foods P is suddenly increased by dielectric heating as shown in FIG. 5B. When the temperature of the sealed prepackaged foods P reaches a predetermined temperature (for example, 120 to 150° C.), the driving of the high frequency electric power generating unit 3 is stopped, proceeding to the sterilizing step X22.

In the sterilizing step X22, the above temperature of the sealed prepackaged foods P (for example, 120 to 150° C.) is held for a predetermined time only by the supply of the steam from the steam generator 51. By holding this temperature for this predetermined time, the sealed prepackaged foods P are substantively sterilized. Upon the completion of heat sterilization for the predetermined time in the sterilizing step X22, the cooling step X23 is performed next.

First, in the cooling step X23, the third control valve 55 is closed to stop the supply of the steam from the steam generator 51 to the food sterilization container 2. Subsequently, the fourth control valve 56 is opened to supply the coolant from the coolant supply source 52 to the first and second temperature adjusting pipes 53, 54. As a result, the sealed prepackaged foods P within the sterilization chamber 23 are cooled substantially to an ordinary temperature as shown in FIG. 5B. Thereafter, the second control valve 46 is opened to discharge the compressed air inside the sterilization chamber 23 outside the sterilizing apparatus, with the result that the sterilization chamber 23 is held at an ordinary pressure. By this cooling operation, it is avoided to hold the temperature suitable for the breeding of bacteria for a long time and, accordingly, the rebreeding of bacteria can be effectively prevented.

When the sealed prepackaged foods P are cooled substantially to an ordinary temperature in the cooling step X23, the lid 22 is raised by the upward movement of the piston rod 27 by the driving of the hydraulic cylinder 26, thereby opening the sterilization chamber 23. Subsequently, the sealed prepackaged foods P within the opened sterilization chamber 23 are unloaded and conveyed to a location of a specified operation at a downstream side. By repeating the respective operation steps by batch processing using the high frequency sterilizing apparatus 1, the sealed prepackaged foods P are successively sterilized.

Figure 6:
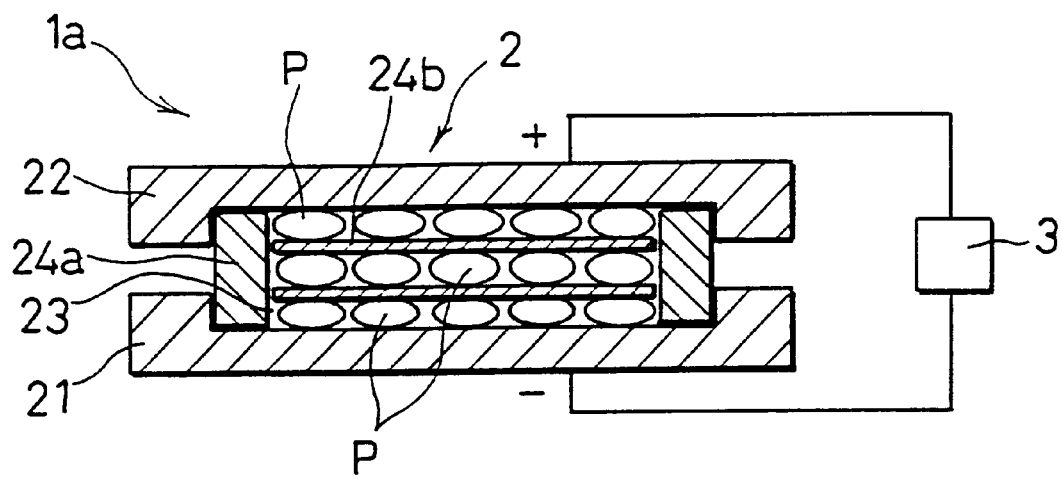
FIG. 6 is a schematic section diagram of a first modification of the first high frequency sterilizing apparatus.

FIG. 6 is a schematic sectional diagram of a first modification of the high frequency sterilizing apparatus. In a high frequency sterilizing apparatus 1a, a seal member 24a having a large height is mounted in the sterilization chamber 23 of the container main body 21. In this modification, the height of the seal member 24a has about three times the thickness of the sealed prepackaged foods P.

Three layers of sealed prepackaged foods P are placed within the sterilization chamber 23, and partition plates 24b of an insulating material are provided between adjacent layers so as not to disarray the layers of the sealed prepackaged foods P. The other construction is similar to that of the high frequency sterilizing apparatus 1.

According to the construction of the high frequency sterilizing apparatus 1a of the first modification, since the sealed prepackaged foods P are loaded in the sterilization chamber 23 while being stacked in a plurality of layers via the partition members 24b, the quantity of the loadable sealed prepackaged foods P per operation can be increased. Such a construction is effective in improving heat sterilization performance.

Figure 7:
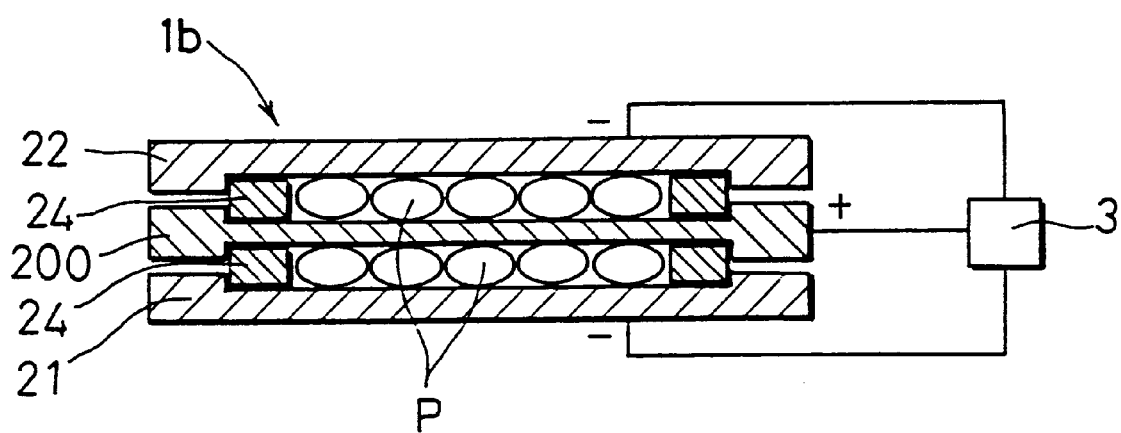
FIG. 7 is a schematic section diagram of a second modification of the first high frequency sterilizing apparatus.

FIG. 7 is a schematic sectional diagram of a second modification of the high frequency sterilizing apparatus. In a high frequency sterilizing apparatus 1b of the second modification, a plate-shaped conductive partition member 200 of metal is disposed between the container main body 21 and the lid 22 when the sealed prepackaged foods P are loaded.

This conductive partition member 200 receives a high frequency electric power from the high frequency electric power generating unit 3 and used as an electrode. Both the container main body 21 and the lid 22 are used as the other electrode.

The conductive partition member 200 can be set in and removed from its position between the container main body 21 and the lid 22 by an unillustrated partition member mounting mechanism. With the partition member 200 mounted between the container main body 21 and the lid 22, annular seal members 24 of insulating material are provided between the container main body 21 and the partition member 200 and between the lid 22 and the partition member 200. Accordingly, the partition member 200 is held insulated to the container main body 21 and the lid 22. The other construction of the high frequency sterilizing apparatus 1b is similar to that of the high frequency sterilizing apparatus 1.

According to the construction of the high frequency sterilizing apparatus 1b of the second modification, after the lid 22 is raised and the partition member 200 is moved from its position between the container main body 21 and the lid 22, the sealed prepackaged foods P are placed in a portion of the container main body 21 enclosed by the seal member 24. Subsequently, the partition member 200 is placed above the container main body 21, and the sealed prepackaged foods P are placed in a portion of the partition member 200 enclosed by the seal member 24. Finally, the lid 22 is fitted on the partition member 200. In this way, the sealed prepackaged foods P are loaded in the high frequency sterilizing apparatus 1b. Since the sealed prepackaged foods P are arranged in two layers using the partition member 200, more sealed prepackaged foods P can be sterilized in one operation.

Figure 8A:
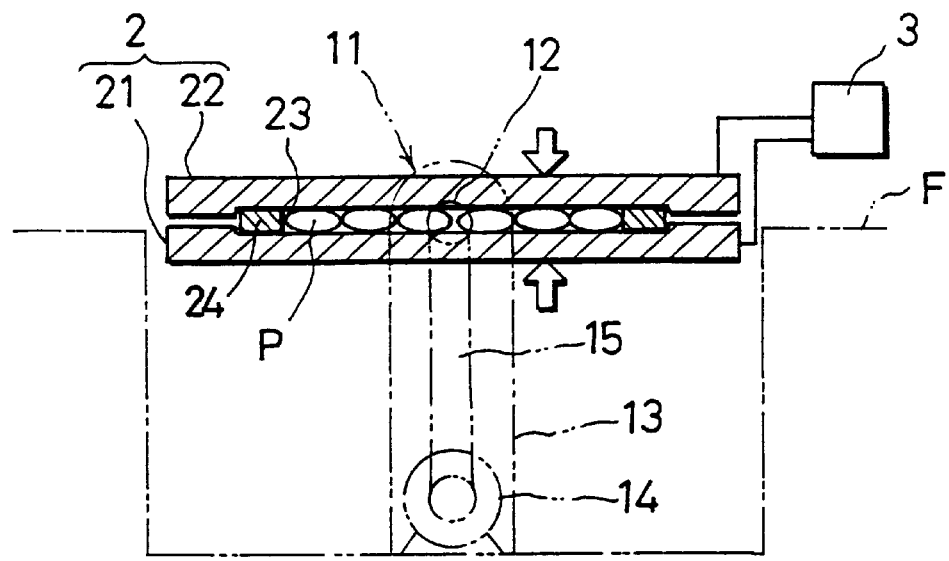
FIGS. 8A to 8C are schematic section diagrams of a third modification of the first high frequency sterilizing apparatus, FIG. 8A showing the first high frequency sterilizing apparatus set in its horizontal position, FIG. 8B showing the first high frequency sterilizing apparatus set in its vertical position, and FIG. 8C showing a state of a sealed prepackaged food when the first high frequency sterilizing apparatus is in its vertical position.
Figure 8B:
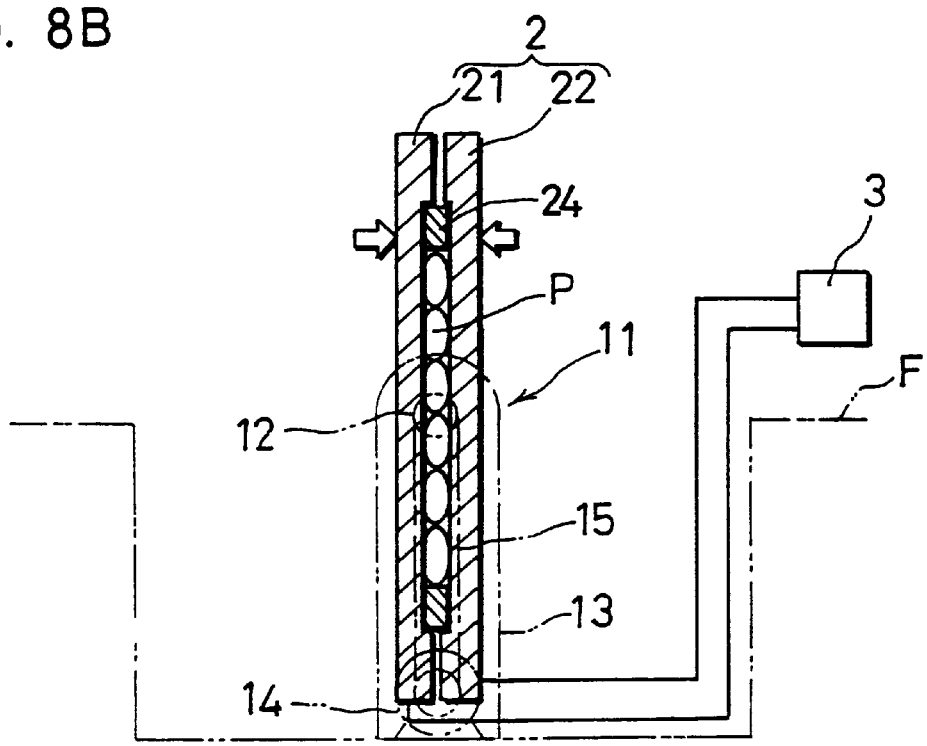
Figure 8C:
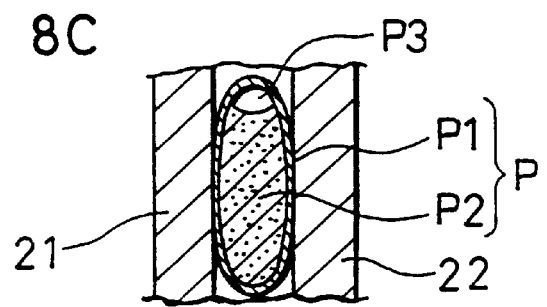

FIGS. 8A to 8C are schematic sections of a third modification of the high frequency sterilizing apparatus, wherein FIG. 8A shows the high frequency sterilizing apparatus set in its horizontal position, FIG. 8B shows the high frequency sterilizing apparatus set in its vertical position and FIG. 8C shows a state of a sealed prepackaged food when the high frequency sterilizing apparatus is in its vertical position.

A high frequency sterilizing apparatus 1c is, as shown in FIGS. 8A and 8B, provided with a food sterilization container 2 comprised of a container main body 21 and a lid 22 as in the high frequency sterilizing apparatus 1 and a rotation mechanism 11 for rotating the food sterilization container 2 between its horizontal position and its vertical position. The rotation mechanism 11 includes a pair of struts 13 standing below a floor F, a horizontal shaft 12 supported on the struts 13 rotatably about its axis, and an unillustrated drive motor 14 for rotating the horizontal shaft 12 about its axis. The horizontal shaft 12 is secured to a center portion of the container main body 21. A drive shaft of the drive motor 14 and the horizontal shaft 12 are coupled via a drive belt 15. The food sterilization container 2 is rotated in forward and reverse directions about the horizontal shaft 12 by driving the drive motor 14 in forward and reverse directions. Thus, the food sterilization container 2 is rotatable between its horizontal position shown in FIG. 8A and its vertical position shown in FIG. 8B.

According to the construction of the high frequency sterilizing apparatus 1c of the third modification, after the sealed prepackaged foods P are loaded in the sterilization chamber 23 of the food sterilization container 2 in its horizontal position as shown in FIG. 8A, the drive motor 14 is driven to bring the food sterilization container 2 to its vertical position shown in FIG. 8B, with the result that foods P2 within packaging containers P1 of the sealed prepackaged foods P move downward by action of gravity. Accordingly, air P3 within each food P2 moves upward of the vertically extending packaging container P1, and no air exists at the sides of the sealed prepackaged foods P with respect to their thickness direction.

Thus, the foods P2 within the packaging container P1 are substantially in direct contact with the container main body 21 and the lid 22 via the packaging container P1. When the food sterilization container 2 is in its horizontal position, the application of a high frequency electric power to the foods P2 may vary due to the air which is present at the sides of the sealed prepackaged foods P with respect to their thickness direction, hindering uniform heating of foods P2. The high frequency sterilizing apparatus 1c can avoid such a disadvantage and is effective in more securely and uniformly heating the sealed prepackaged foods P.

Figure 9:
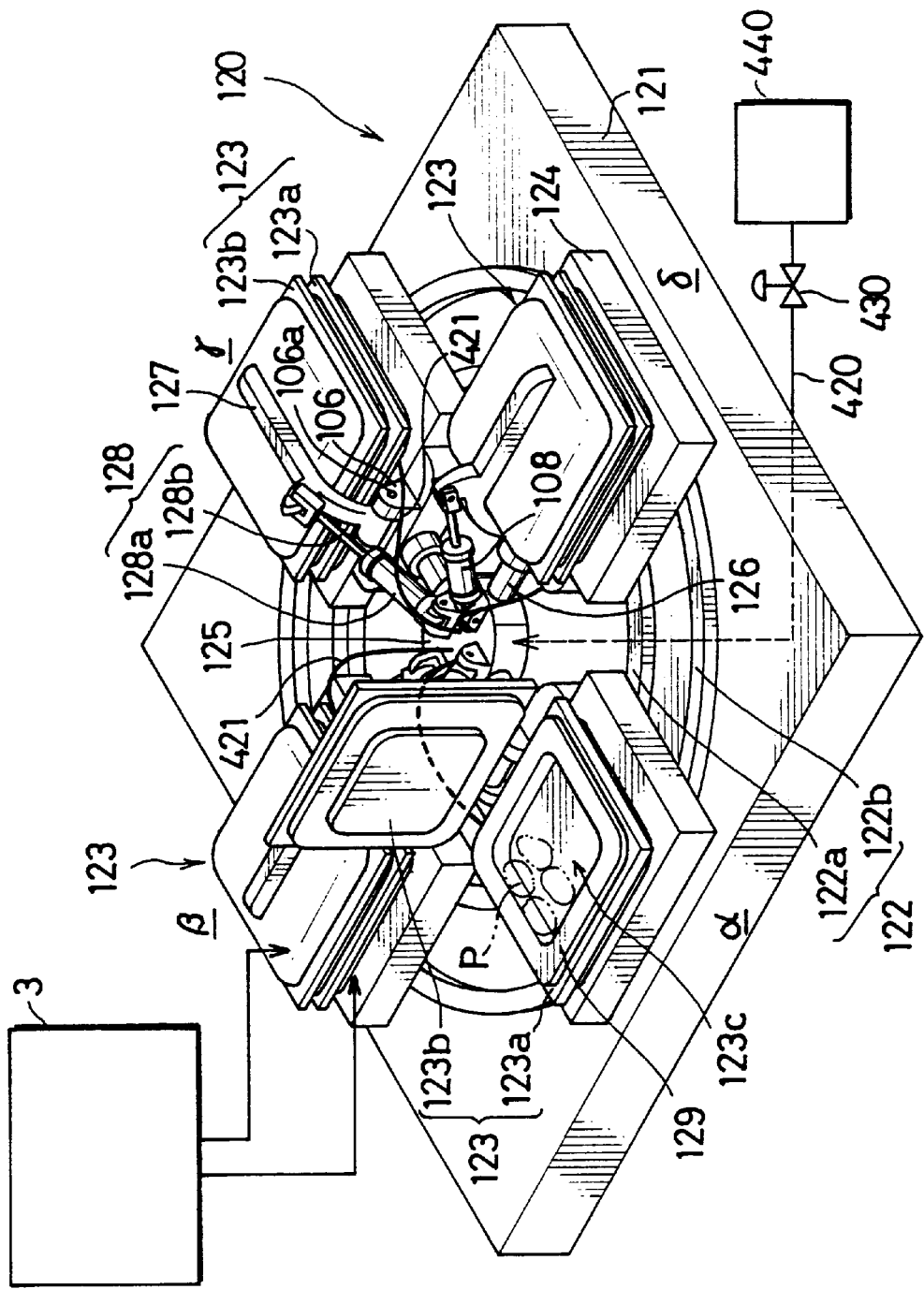
FIG. 9 is a perspective view partly cut away of a second high frequency sterilizing apparatus embodying the invention.

FIG. 9 is a perspective view partly cut away of a second high frequency sterilizing apparatus according to the invention. In the second embodiment, a high frequency sterilizing apparatus 120 is provided with a base 121 which has a square shape when viewed from above, an annular track 122 comprising a pair of rails 122a, 122b laid on the upper surface of the base 121, and a plurality of high frequency sterilization containers 123 which are free to move on the annular track 122. In this embodiment, four high frequency sterilization containers 123 are used.

These four high frequency sterilization containers 123 are fixedly placed on carriages 124 arranged on the annular track 122 at equal intervals, and move around with the carriages 124 which run while being guided by the annular track 122.

On the other hand, the base 121 is, in its center, provided with a rotary disk 125 projecting upward. Four coupling rods 126 radially projecting at equal intervals are provided on the outer circumferential surface of the rotary disk 125. The leading ends of the coupling rods 126 are secured to the carriages 124. In a lower portion of the rotary disk 125 is provided a driver including an unillustrated drive motor. The rotary disk 125 is rotated about its vertical axis by driving the driver. Thus, the high frequency sterilization containers 123 move around by the circulatory movement of the carriages 124 on the annular track 122.

Each high frequency sterilization container 123 comprises a container main body 123a as a lower electrode and a lid 123b as an upper electrode. Further, each carriage 124 is provided with a bracket 106 on its side surface facing the rotary disk 125, and an L-shaped upper lid member 127 rotatably provided on the bracket 106 about a horizontal axis 106a. The lid 123b is secured to a lower part of the upper lid member 127. By rotating the upper lid member 127 about the horizontal axis 106a in forward and reverse directions, the lid 123b can be opened and closed with respect to the container main body 123a.

Between the upper lid member 127 and the rotary disk 125 is provided a cylinder device 128. The base end of a cylinder 128a of the cylinder device 128 is rotatably mounted on the rotary disk 125, and the leading end of a piston rod 128b thereof is rotatably mounted on the upper lid member 127. Accordingly, by driving the cylinder device 128 in forward and reverse directions, the lid 123b can be opened and closed via the piston rod 128b and the upper lid member 127.

A center portion of the container main body 123a is recessed to form a sterilization chamber 123c for loading sealed prepackaged foods P. A seal member 129 having an unillustrated O-ring disposed on its surface is provided at the periphery of the sterilization chamber 123c. When the sterilization chamber 123c is closed by the lid 123b, the edges of the lower surface of the lid 123b come into contact with the seal member 129 via the O-ring, with the result that the sterilization chamber 123c is sealed.

A high frequency electric power generating unit 3 is arranged in the vicinity of the high frequency sterilizing apparatus 120 to supply a high frequency electric power to the container main body 123a and the lid 123b.

Further, in the vicinity of the high frequency sterilizing apparatus 120 is provided a high pressure tank (atmospheric pressure changer) 440 for storing a highly pressurized air. A high pressure pipe 420 is connected with the high pressure tank 440. A control valve 430 is provided in the high pressure pipe 420, and a downstream end thereof is connected with an unillustrated rotary joint provided inside the rotary disk 125. High pressure branch pipes 421 are provided between this rotary joint and the respective high frequency sterilization containers 123. The rotary joint is a connection device for communicating the high pressure pipe 420 with the respective high pressure branch pipes 421 to convey fluid while permitting the rotation of the rotary disk 125.

When the high frequency sterilization container 123 reaches a high frequency electric power supplying position (β) to be described later, the high pressure branch pipe 421 thereof communicates with the high pressure pipe 420. When the high frequency sterilization container 123 is moving and when the sealed prepackaged foods P are located in a food loading position (α) and a food warming position (γ) to be described later, the high pressure branch pipe 421 and the high pressure pipe 420 are not in communication with each other. When the sealed prepackaged foods P are located in a food cooling position (δ) to be described later, a base end (at the side of the rotary disk 125) of the high pressure branch pipe 421 is open to the outside.

In this embodiment, the food loading position (α), the high frequency electric power supplying position (β), the food warming position (γ) and the food cooling position (δ) are set on the respective sides of the base 121. By the intermittent 90-degree rotation of the rotary disk 125 by the unillustrated driver, the respective high frequency sterilization containers 123 are successively located in the positions (α), (β), (γ), and (δ).

When the high frequency sterilization container 123 is located in the food loading position (α), the lid 123b is opened by driving the cylinder device 128 and, in this state, the sealed prepackaged foods P are unloaded from the sterilization chamber 123c and new sealed prepackaged foods P are loaded into the container main body 123a. Upon the completion of loading of the sealed prepackaged foods P, the cylinder device 128 is driven to close the sterilization chamber 123c by the lid 123b and, then, the high frequency sterilization container 123 is conveyed to the high frequency electric power supplying position (β) by the rotation of the rotary disk 125.

In the high frequency electric power supplying position (β), a highly pressurized air from the high pressure tank 440 is admitted into the high frequency sterilization container 123 via the unillustrated rotary joint to hold the inside of the high frequency sterilization container 123 in a specified highly pressurized state. Subsequently, a high frequency electric power from the high frequency electric power generating unit 3 is supplied to the high frequency sterilization container 123, with the result that the sealed prepackaged foods P within the sterilization chamber 123c are heated to 100° C. or higher by the high frequency electric power. After the high frequency heating for a predetermined time, the high frequency sterilization container 123 is conveyed to the food warming position (γ) where it is warmed for a predetermined time to perform a substantive heat sterilization. Thereafter, the high frequency sterilization container 123 is conveyed to the food cooling position (γ) to be cooled. To effect this cooling, cooled air or cooled water is supplied to the high frequency sterilization container 123. After the cooling, the high frequency sterilization container 123 is held at an ordinary pressure after the highly pressurized air inside is discharged.

A series of the above operations are performed for each of the high frequency sterilization containers 123, thereby realizing an effective high frequency sterilization for the sealed prepackaged foods P.

Figure 10:
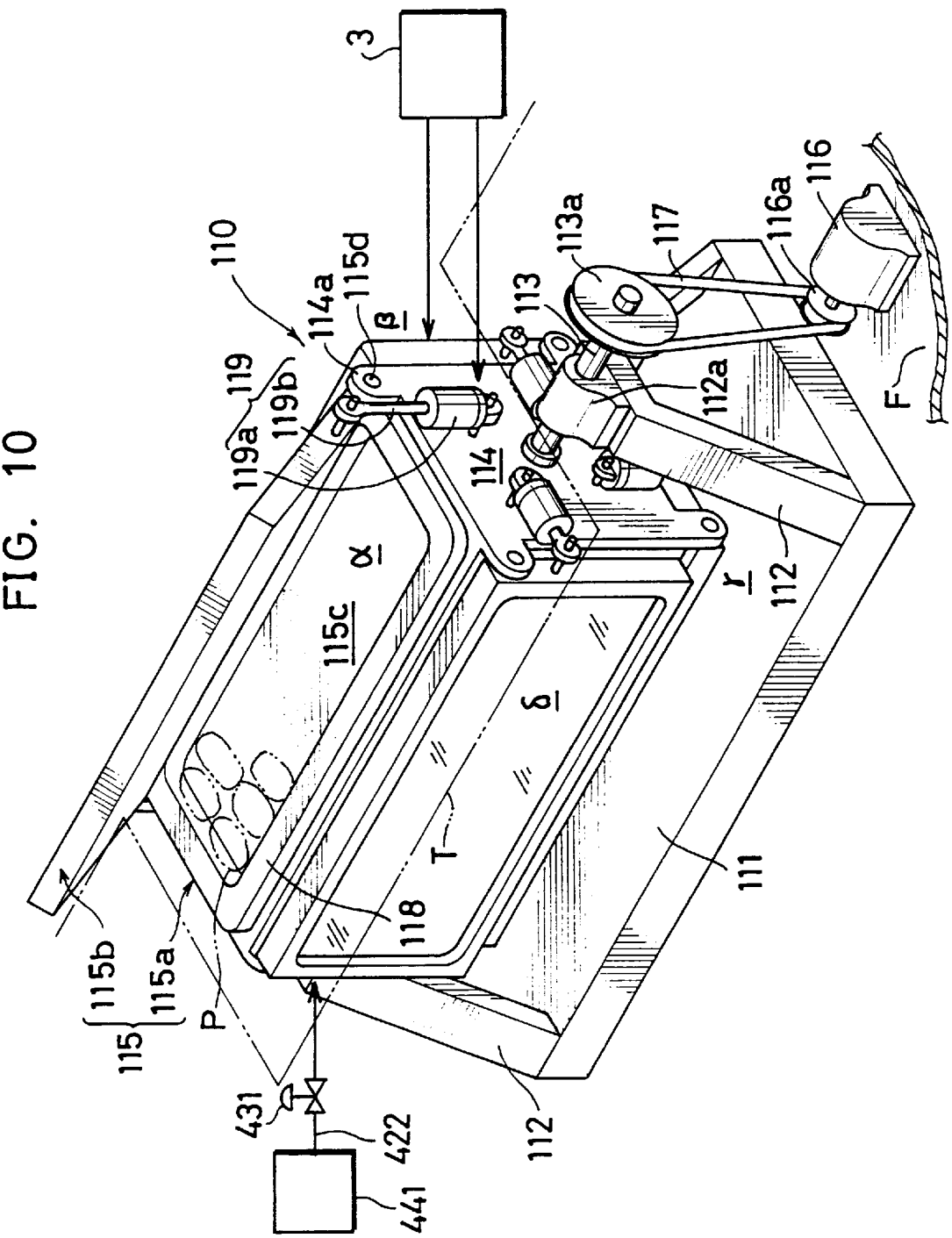
FIG. 10 is a perspective view partly cut away of a third high frequency sterilizing apparatus embodying the invention.

FIG. 10 is a perspective view partly cut away of a third high frequency sterilizing apparatus according to the invention. In the third embodiment, a high frequency sterilizing apparatus 110 is provided with a base 111 which is rectangular-shaped when viewed from above, a pair of support frames 112 which stand at the opposite sides of the base 111 with respect to its longitudinal direction and have each a bearing 112a at its top, a horizontal support shaft 113 which is rotatably supported by the bearings 112a about its center axis, a rectangular parallelepipedic rotary body 114 having the opposite side surfaces thereof integrally supported on the support shaft 113, and high frequency sterilization containers 115 provided on four outer surfaces of the rotary body 114. Above the high frequency sterilizing apparatus 110 is provided steps T used to facilitate the loading and unloading of sealed prepackaged foods P into and out of the high frequency sterilizing apparatus 110.

A driven pulley 113a is mounted on a portion of the support shaft 113 projecting outward from the bearing 112a, and a drive motor 116 corresponding to this driven pulley 113a is provided on a floor F. A drive pulley 116a is mounted on a drive shaft of the drive motor 116, and a coupling belt 117 is fitted on the drive pulley 116a and the driven pulley 113a. When the drive motor 116 is driven, the rotary body 114 rotates together with the support shaft 113 via the drive pulley 116a, the coupling belt 117 and the driven pulley 113a.

Each high frequency sterilization container 115 comprises a container main body 115a as a first electrode secured to the rotary body 114 and a lid 115b for closing a sterilization chamber 115c as a second electrode which is a recess formed in the surface of the container main body 115a. A high frequency electric power from a high frequency electric power generating unit 3 arranged in the vicinity of the high frequency sterilizing apparatus 110 is supplied to the container main body 115a and the lid 115b via an unillustrated connection means.

In this embodiment, a food loading position (α), a high frequency electric power supplying position (β), a food warming position (γ) and a food cooling position (δ) are set on the respective surfaces of the rotary body 114. By the intermittent 90-degree rotation of the rotary body 114 by means of the drive motor 116, the respective high frequency sterilization containers 125 are successively located in the positions (α), (β), (γ), and (δ).

Further, a high pressure tank (atmospheric pressure changer) 441 which is adapted to store a high pressure air and connected with a high pressure pipe 422 is provided in the vicinity of the high frequency sterilizing apparatus 110. A control valve 431 is provided in the high pressure pipe 422 and a downstream end of the high pressure pipe 422 is connected with an unillustrated rotary joint provided in a specified position of the support shaft 113. Unillustrated high pressure branch pipes extend from this rotary joint to the respective high frequency sterilization containers 115.

When the high frequency sterilization container 115 reaches the high frequency electric power supplying position (β), the high pressure branch pipe thereof communicates with the high pressure pipe 422. When the high frequency sterilization container 115 is moving and when the sealed prepackaged foods P are located in the food loading position (α) and the food warming position (γ), the high pressure branch pipe and the high pressure pipe 422 are not in communication with each other. When the sealed prepackaged foods P are located in the food cooling position (δ), a base end (at the side of the rotary body 114) of the high pressure branch pipe is open to the outside.

Outwardly projecting horizontal shafts 115d are provided at base ends of the opposite sides of each lid 115b with respect to its longitudinal direction, and outwardly projecting bearings 114a are provided at the respective corners of the opposite sides of the rotary body 114. The horizontal shafts 115d are rotatably supported by the bearings 114a. Accordingly, each lid 115b is pivotal in clockwise and counterclockwise directions about the horizontal shafts 115d to open and close the sterilization chamber 115c.

Each container main body 115a is provided, at the periphery of the sterilization chamber 115c, with a seal member 118 having an unillustrated O-ring, so that the sterilization chamber 115c can be sealed when being closed by the lid 115b.

A cylinder device 119 is provided between a side surface portion of the rotary body 114 and a side edge portion of each lid 115b. The base end of a cylinder 119a of each cylinder device 119 is rotatably mounted on the side surface portion of the rotary body 114, and the leading end of a piston rod 119b is rotatably mounted on the side edge portion of the lid 115b. Accordingly, the lids 115b are opened and closed by driving the cylinder devices 119 in forward and reverse directions.

In this embodiment, the rotary body 114 is intermittently rotated in a clockwise direction about the support shaft 113 of FIG. 10. The high frequency sterilization container 115 is in the food loading position (α) where it is in an upper horizontal position: in the high frequency electric power supplying position (β) rotated from the food loading position (α) by 90 degrees: in the food warming position (γ) where it is a lower horizontal position: and in the food cooling position (δ) rotated from the food warming position (γ) by 90 degrees. In the food cooling position (δ), the drive motor 116 is temporarily stopped.

When the high frequency sterilization container 115 is located in the food loading position (α), the lid 115b is opened by driving the cylinder device 119 to unload the sealed prepackaged foods P in the sterilization chamber 115c and to load new sealed prepackaged foods P thereinto. Subsequently, the high frequency sterilization container 115 closed by the lid 115b by driving the cylinder device 119 is conveyed to the successive high frequency electric power supplying position (β) where, after a highly pressurized air from the high pressure tank 441 is admitted into the sterilization chamber 115c to hold it in a highly pressurized state, the sealed prepackaged foods P in the sterilization chamber 115c are heated to 100° C. or higher by being subjected to a high frequency electric power from the high frequency electric power generating unit 3. Subsequently, the sealed prepackaged foods P are substantively sterilized by being warmed in its food warming position (γ) and then cooled in the food cooling position (δ). After the cooling, the highly pressurized air inside the high frequency sterilization container 115 is discharged, thereby bringing the pressure therein back to an ordinary pressure. A series of the above operations are performed for each of the high frequency sterilization containers 115, thereby realizing an effective high frequency sterilization for the sealed prepackaged foods P.

Figure 11:
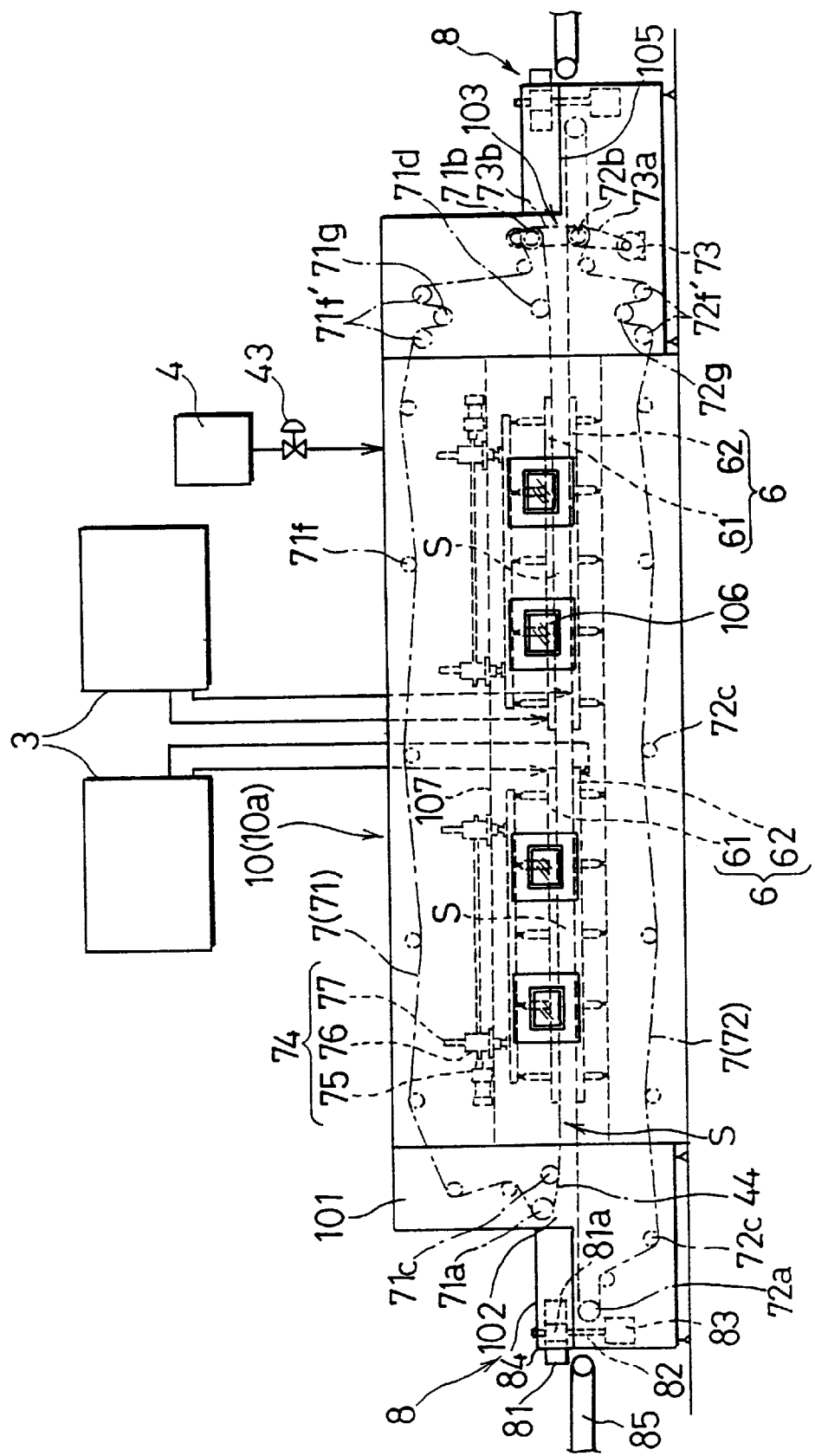
FIG. 11 is a diagram of a fourth high frequency sterilizing apparatus embodying the invention.

FIG. 11 is a diagram of a fourth high frequency sterilizing apparatus according to the invention. This embodiment is adopted to continuously perform the temperature increasing step of the sterilization to the sealed prepackaged foods P. A high frequency sterilizing apparatus 10 has a basic construction including an apparatus main body (sealed container) 10a, a high frequency electric power generating unit 3, a pressurizing unit 4, and sealed loading and unloading mechanisms 8. The apparatus main body 10a is internally provided with electrode assemblies 62 each comprising opposed upper and lower electrodes 61 and 62 for heating the sealed prepackaged foods P to a predetermined sterilization temperature and holding this heated state. The high frequency electric power generating unit 3 supplies a high frequency electric power to the electrode assemblies 6 of the apparatus main body 10a. The pressurizing unit 4 supplies a compressed air to the apparatus main body 10a in order to hold the inside of the apparatus main body 10a at a specified pressure. The sealed loading and unloading mechanisms 8 load and unload the sealed prepackaged foods P into and from the apparatus main body 10a while the highly pressurized state of the apparatus main body 10a is held.

The high frequency electric power generating unit 3 and the pressurizing unit 4 adopted in this embodiment are similar to those adopted in the first embodiment. The sealed prepackaged foods P are heated by high frequency electric power applied to the electrode assemblies 6 to be described later, and the pressure within the apparatus main body 10a can be automatically constantly maintained in a preset highly pressurized state (for example, 2 to 5 atm).

The apparatus main body 10a is provided with a supply unit 102 for the sealed prepackaged foods P on one side thereof, and with a transversely long box-shaped casing 101 formed with a discharge port 103 for the sealed prepackaged foods P on the other side thereof. Inside the casing 101 is provided a conveyor belt assembly 7 (conveyor) comprising an upper belt 71 and a lower belt 72 which are movable in a circulatory manner. The conveyor belt assembly 7 is made of a synthetic resin or like material which has a property of passing a high frequency electric power. In this embodiment, the conveyor belt assembly 7 is made of polytetrafluoroethylene.

The lower belt 72 is provided in the lower half of the inside of the casing 101 and fitted on a lower front roller 72a and a lower rear roller 72b and a plurality of lower auxiliary rollers 72c disposed in specified positions below the rollers 72a, 72b. The rollers 72a, 72b are rotatably disposed in the supply unit 102 and the discharge port 103 about their support shafts, respectively. A drive motor 73 is provided below the rear roller 72b. A torque of the drive motor 73 is transmitted to the rear roller 72b via a lower transmission belt 73a. Accordingly, a torque obtained by driving the drive motor 73 is transmitted to the lower and upper belts 72, 71 via the transmission belt 73a and the rear roller 72b. As a result, the lower belt 72 rotates clockwise of FIG. 11, and the upper belt 71 rotates counterclockwise of FIG. 11 in synchronism with the lower belt 72.

As shown in FIG. 11, a glass window 106 is provided in a suitable position of a center portion of a side portion of the casing 101 with respect to the vertical direction. The movement of the conveyor belt assembly 7 and the heated state of the sealed prepackaged foods P within the casing 101 can be observed through this window 106.

The upper belt 71 is disposed in the upper half of the casing 101 so as to face the lower belt 72. The upper belt 71 is fitted on an upper front roller 71a located in the supply unit 102, a front pressing roller 71c disposed immediately downstream from the upper front roller 71a, an upper rear roller 71b disposed above the lower rear roller 72b so as to face it, a rear pressing roller 71d disposed immediately upstream from the upper rear roller 71b and upper auxiliary rollers 71f disposed in specified positions above the rollers 71a, 71b, 71c and 71d. A tension roller 71g for tensioning the upper belt 71 is provided between a pair of upper auxiliary rollers 71f' disposed downstream from the upper rear roller 71b. The tension roller 71g is made movable upward and downward by a suitable biasing means. A pair of lower auxiliary rollers 72f' and a tension roller 72g which are similar to the above rollers are provided downstream from the lower rear roller 72b.

The lower rear roller 72b and the upper rear roller 71b have the same diameter and are connected by the upper transmission belt 73b. Accordingly, when the drive motor 73 is driven, its torque is transmitted to the lower rear roller 72b via the lower transmission belt 73a and also to the upper rear roller 71b via the upper transmission belt 73b. Thus, the lower and upper belts 72, 71 rotate at the same speed.

A heating space S for heating the passing sealed prepackaged foods P is defined between a downward facing surface of the upper belt 71 between the front pressing roller 71c and the rear pressing roller 71d and an upward facing surface of the lower belt 72 between the lower front roller 72a and the lower rear roller 72b.

The front pressing roller 71c is disposed lower than the front roller 71a. Accordingly, a sloped portion 44 which is inclined obliquely downward to the downstream side is formed in the upper belt 71 between the upper front roller 71a and the front pressing roller 71c. The sealed prepackaged foods P can be smoothly conveyed to the heating space S by being guided by the sloped portion 44.

The upstream and downstream ends of the lower belt 72 are both located more outward of the upstream and downstream ends of the upper belt 71 with respect to a horizontal direction. In order to enclose the longer lower belt 72, the lower half of the casing 101 project forward and backward from the upper half thereof. In the front projecting portion of the lower half of the casing 101 is formed a loading portion 104 having an open upper portion to load new sealed prepackaged foods P from an installation at an upstream side. In the rear projecting portion of the lower half of the casing 101 is formed an unloading portion 105 for unloading the heated sealed prepackaged foods P. By proving the loading and unloading portions 104, 105, the loading of the sealed prepackaged foods P from the upstream side into the apparatus main body 10a and the unloading of the sealed prepackaged foods P from the apparatus main body 10a can be easily performed.

In this embodiment, the upper electrodes 61 in the form of a flat plate are so disposed as to be in proximity to or sliding contact with the rear surface of the upper belt 71 whose front surface is facing the heating space S. The lower electrodes 62 in the form of a flat plate are so disposed as to be in proximity to or sliding contact with the rear surface of the lower belt 72 whose front surface is facing the heating space S. In this embodiment, two electrode assemblies 6 each comprising a pair of upper and lower electrodes 61, 62 are provided in series. The number of the electrode assemblies 6 is not limited to 2, but may be one, three or more.

The lower electrodes 62 are fixed in the casing 101, whereas the upper electrodes 61 are movable upward and downward. In order to make the upper electrodes 61 movable upward and downward, electrode elevating mechanisms 74 are provided between the upper auxiliary rollers 71f and the upper electrodes 61 inside the casing 101.

Each electrode elevating mechanism 74 is provided with an elevation motor 75, a direction converter 76 and a rack shaft 77. The elevation motor 75 is fixedly placed on a support plate 107 horizontally arranged between the forward and backward moving portions of the upper belt 71 provided in the upper half of the casing 101. The direction converter 76 translates the rotation of a rotatable shaft 61a (see FIG. 12) of the elevation motor 75 into a vertical movement. The rack shaft 77 is provided in the direction converter 76 and is connected with the upper electrode 61 through the support plate 107. An unillustrated pinion concentric with the rotatable shaft 61a is provided in the direction converter 76. This pinion and the rack shaft 77 are in mesh with each other. Accordingly, when a rotatable shaft 75a is rotated by driving the elevation motor 75, this rotation is translated into upward and downward movements of the rack shaft 77 via the pinion.

Lower end portions of the rack shafts 77 having passed through the support plate 107 are fixed to a connection plate 78 horizontally extending toward the downstream side. This connection plate 78 (see FIG. 12) and the upper electrode 61 are connected via coupling rods 79.

At a bottom end of each coupling rod 79 is provided a boss 79b (see FIG. 12) which is relatively movable upward and downward within a specified range. This boss 79b is fixed to the upper electrode 61, and a coil spring 79a (see FIG. 12) is mounted on each coupling rod 79 between the connection plate 78 and the boss 79b. Since the coil springs 79a are biased in such a direction to move the connection plate 78 and the bosses 79b away from each other, the upper electrode 61 is constantly pressed downward by the biasing forces of the coil springs 79a via the bosses 79b.

Instead of the rack shafts 77 of the direction converter 76, screw shafts may be adopted. These screw shafts may be screwed to bearings formed with internal threads which are provided on the support plate 107 and made movable upward and downward by converting the rotation of the horizontally extending rotatable shafts 75a into the rotation of the vertically extending screw shafts via bevel gears.

In this embodiment, as shown in FIG. 11, one elevation motor 75 and two direction converters 76 are adopted for one upper electrode 61. The two direction converters 76 are coupled with the elongated common rotatable shaft 75a, and one connection plate 78 is fixed to the lower ends of a pair of rack shafts 77 provided in the two direction converters 76. Five coupling rods 79 are provided on the lower surface of the connection plate 78, and the lower ends thereof are fixed in the positions of the upper surface of the upper electrode 61 which are symmetrical with respect to the center of gravity of the upper electrode 61.

Accordingly, if the elevation motor 75 is driven to lower the coupling rods 79 via the rotatable shaft 75a, the rack shafts 77 and the connection plate 78, the upper electrode 61 at a specified height is lowered as indicated by broken lines, thereby pressing the upper belt 71 downward. Thus, a vertical dimension of the heating space S between the upper belt 71 and the lower belt 72 is narrowed. Conversely, when the upper electrode 61 is moved upward by driving the elevation motor 75 in its reverse direction, this vertical dimension of the heating space S is widened.

Figure 12:
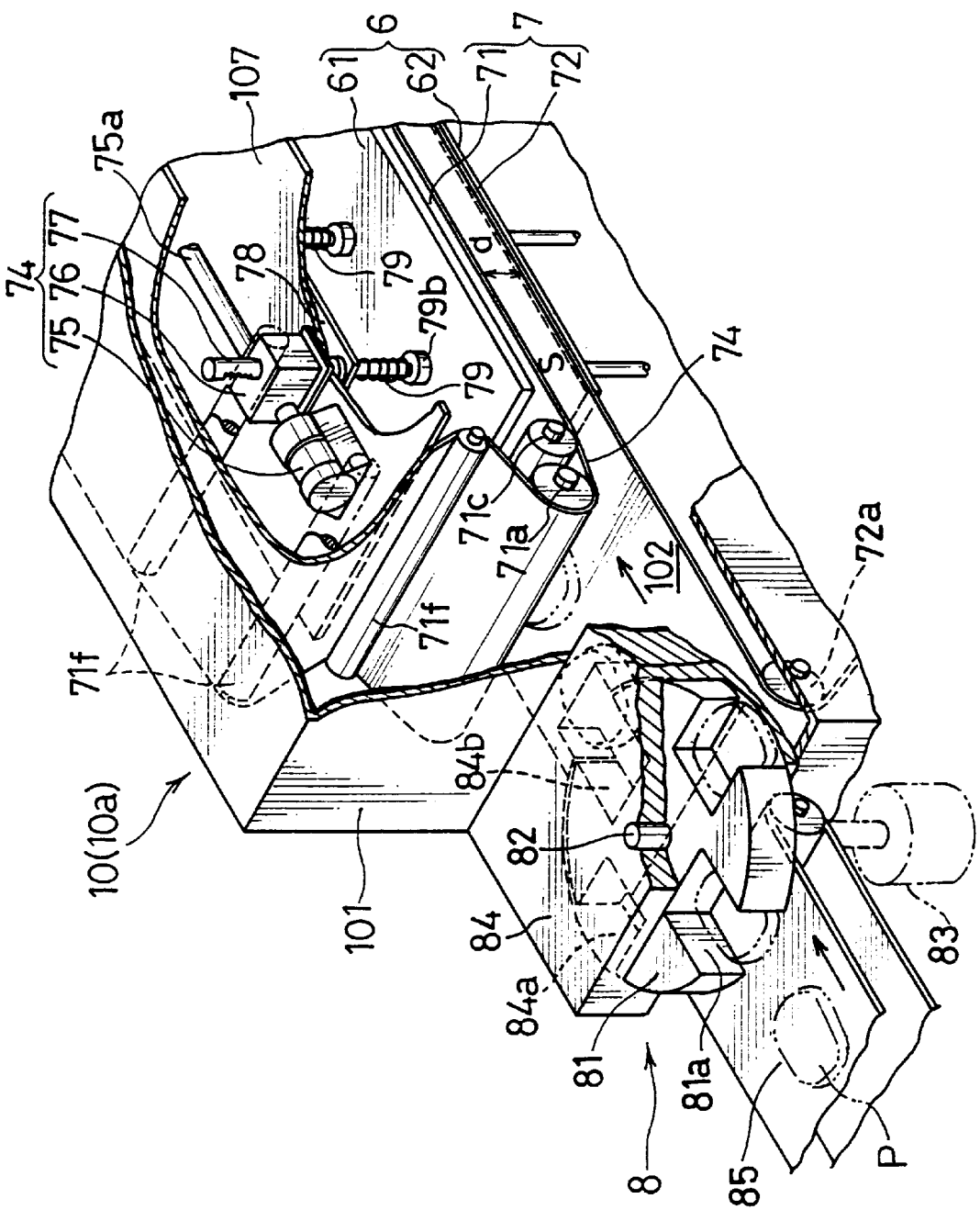
FIG. 12 is a perspective view partly cut away of a sealed loading/unloading mechanism.

FIG. 12 is a perspective view partly cut away of a sealed loading mechanism 8. The sealed loading mechanism 8 shown in FIG. 12 is provided at the entrance of the apparatus main body 10a. At the exit of the apparatus main body, there is provided a sealed unloading mechanism 8 having a similar construction.

The sealed loading mechanism 8 includes a rotary feeder 81 rotatably provided together with a vertical shaft 82, a drive motor 83 for rotating the vertical shaft 82 about its axis, and a seal member 84 provided in the loading portion 104 for sealably enclosing the rotary feeder 81.

The rotary feeder 81 is a metal disk formed with a plurality of prepackaged food recesses 81a which are circumferentially spaced at equal intervals. In this embodiment, four prepackaged food recesses 81a are provided. The vertical shaft 82 is provided at a boundary between the upstream end of the apparatus main body 10a and the downstream end of a conveyor belt 85 used for a previous operation step. Accordingly, a part of the rotary feeder 81 downstream from the vertical shaft 82 is located in the supply unit 102 above the lower belt 72, and a part thereof upstream from the vertical shaft 82 is located above the conveyor belt 85.

The drive motor 83 used in this embodiment is a stepping motor whose rotation can be easily controlled. The drive motor 83 is intermittently driven by 90 degrees in synchronism with the moving speed of the conveyor belts 7, 85. The torque of the drive motor 83 is transmitted to the rotary feeder 81 via the vertical shaft 82.

The seal member 84 is formed with a feeder chamber 84a for surrounding approximately two thirds of the rotary feeder 81 at the upstream end of the casing 101. With the rotary feeder 81 mounted in the feeder chamber 84a, the upper, lower and outer circumferential surfaces of the rotary feeder 81 are in slidable contact with the ceiling, bottom and inner circumferential surfaces of the feeder chamber 84a. In this way, the rotary feeder 81 is made rotatable while ensuring the sealability of the casing 101. The feeder chamber 84a does not provide a bottom surface for the prepackaged food recess 81a located in its position opening in the moving direction of the lower belt 72. Accordingly, the sealed prepackaged food P having reached this position by the rotation of the rotary feeder 81 is conveyed onto the lower belt 72 located below.

The seal member 84 is also formed at its downstream side with a prepackaged food discharge port 84b communicating with the feeder chamber 84a. The discharge port 84b is so formed as to face the prepackaged food recess 81a and has an open lower portion and an open downstream portion.

In the sealed loading mechanism 8 thus constructed, the sealed prepackaged food P having been conveyed by the conveyor belt 85 and reached the downstream end of the mechanism 8 is fitted into the prepackaged food recess 81a of the rotary feeder 81 temporarily stopping by the intermittent driving. Subsequently, this prepackaged food recess 81a is introduced into the feeder chamber 84a of the seal member 84 by rotating the drive motor 83 by 90 degrees; conveyed, by further 90-degree rotation of the motor 83, to the position facing the prepackaged food discharge port 84a, where it is transferred to the lower belt 72 and conveyed toward the electrode assembly 6.

In transferring the sealed prepackaged food P to the inside of the casing 101 using the sealed loading mechanism 8, since a part of the rotary feeder 81 toward the casing 101 is in slidable contact with the ceiling, bottom and inner circumferential surfaces of the feeder chamber 84a of the seal member 84, the supply of the sealed prepackaged foods P to the inside of the casing 101 by the rotation of the rotary feeder 81 does not cause a leakage of the highly pressurized air inside the casing 101. As a result, the highly pressurized state inside the casing 101 can be securely ensured.

Figure 13:
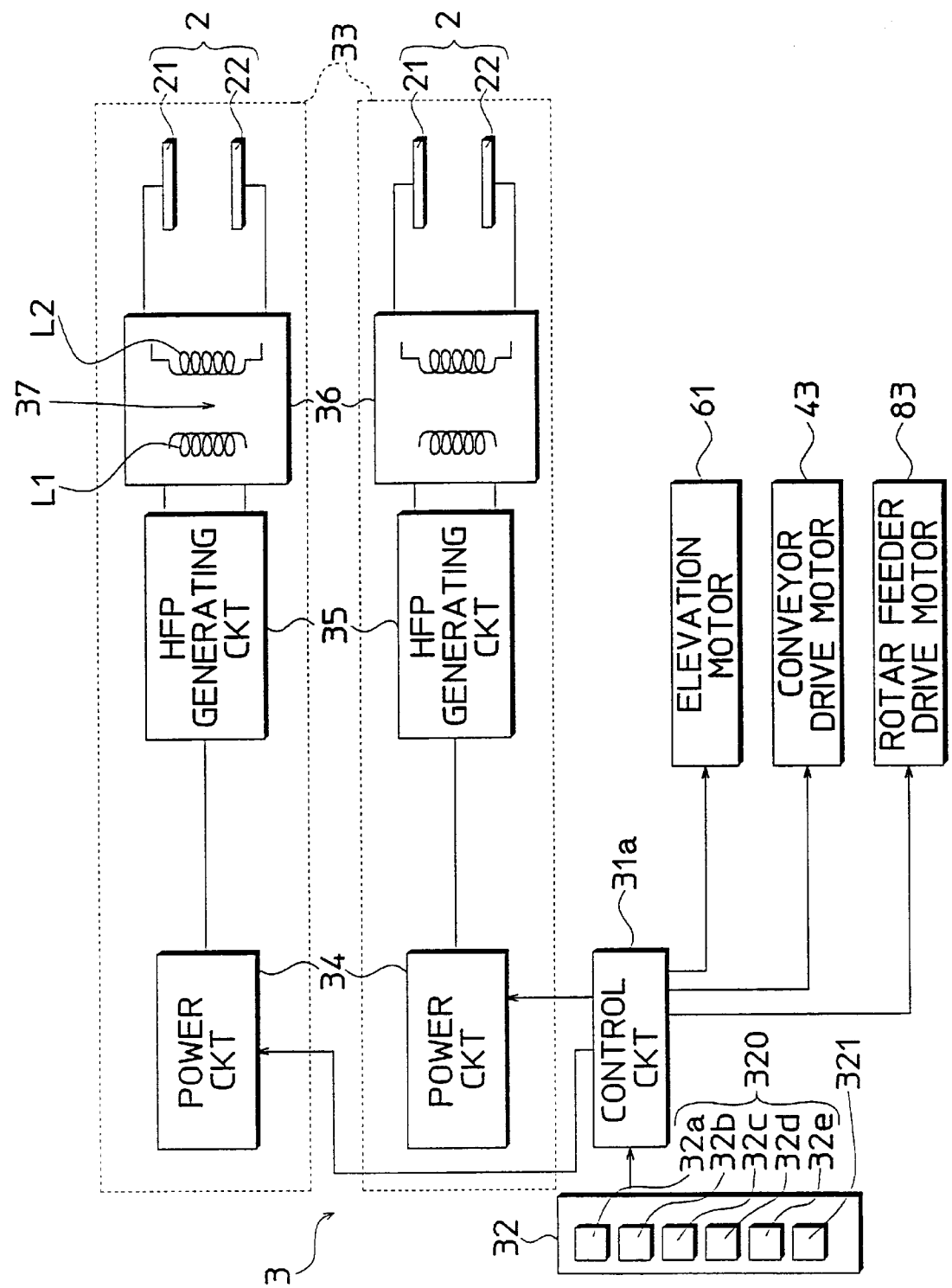
FIG. 13 is a block diagram of a high frequency generating unit in the fourth high frequency sterilizing apparatus.

FIG. 13 is a block diagram of a high frequency electric power generating unit 3 used in the fourth embodiment. The high frequency electric power generating unit 3 is similar to that of the first embodiment except that two of the high frequency electric power generating unit 3 of the first embodiment are juxtaposed in the fourth embodiment, one used for the upper electrodes 61 and the other used for the lower electrodes 62 and that a control circuit 31a is used to control the driving of the drive motor 73 for the conveyor belt assembly 7, the elevation motor 75 and the drive motor 83 for the rotary feeder 81.

In an operation unit 32, there are provided operation buttons 320 and data input keys 321 for inputting the kind, weight and other information of the sealed prepackaged foods P. The operation buttons 320 include start and stop buttons 32a, 32b for starting and stopping the high frequency electric power generating unit 3, respectively, an up-button 32c for driving the elevation motor 75 so as to move the upper electrodes 61 upward, a down-button 32d for driving the elevation motor 75 so as to move the upper electrodes 61 downward, a speed dial 32e for setting the rotational speed of the drive motor 73 for the conveyor belt assembly 7, and a drive/stop button 32f for driving and stopping the drive motor 83 of the sealed loading and unloading mechanisms 8.

Operation signals from the start button 32a and the stop button 32b are outputted to necessary circuits as control signals via the control circuit 31a. When the start button 32a is operated, the operation of the high frequency electric power generators 33 is started and the drive motor 73 starts rotating. When the stop button 32b is operated, the operation of the high frequency electric power generators 33 is stopped and the drive motor 73 stops rotating.

The operation signals from the up- and down-buttons 32c, 32d are sent to the elevation motors 75 as control signals via the control circuit 31a, thereby driving the elevation motors 75 to adjust the height of the upper electrodes 61.

A signal from the speed dial 32 representing its operated amount of the speed dial 32 is sent to the drive motor 73 as a control signal via the control circuit 31a, thereby driving the drive motor 73 at a speed corresponding to the operated amount of the speed dial 32.

Further, the drive motors 83 of the sealed loading and unloading mechanisms 8 are driven by operating the drive/stop button 32f to the drive side, whereas the drive motors 83 are stopped by operating the drive/stop button 32f to the stop side. In this embodiment, the rotating speed of the drive motors 83 of the sealed loading and unloading mechanisms 8 are synchronized with the rotating speed of the drive motor 73 for the conveyor belt assembly 7. This prevents the sealed prepackaged foods P discharged from the rotary feeder 81 from coming into contact with each other on the lower belt 72 and from being excessively spaced away from each other.

The operation of the fourth high frequency sterilizing apparatus 10 is described. First, prior to the sterilization, the first control valve 43 (see FIG. 11) is opened to admit a compressed air into the casing 101. Thus, the inside of the casing 101 is held in a specified highly pressurized state (2 to 5 atm). Hereafter, this highly pressurized state is constantly detected by an unillustrated pressure sensor and a feedback control is performed to automatically open and close the first control valve 43, so that the inside of the casing 101 is constantly held at a preset pressure.

Subsequently, the up- and down-buttons 32c, 32d of the operation unit 32 shown in FIG. 13 are operated to set a vertical dimension (spacing d in FIG. 11) between the upper belt 71 and the lower belt 72 where the sealed prepackaged foods P to be sterilized pass. Further, the moving speed of the sealed prepackaged foods P is set by operating the speed dial 32e. Further, the data entry keys 321 are operated to input the kind and weight per piece of the sealed prepackaged foods P and, if necessary, the number of sealed prepackaged foods P to be arranged along the width of the belt and an interval between rows.

Subsequently, when the start button 32a of the operation unit 32 is operated, the high frequency generators 33 are driven to start supplying a power calculated as above or a specified power to the electrode assemblies 6, with the result that the heating space S are formed between the upper electrodes 61 and the lower electrodes 62. Further, the drive motor 73 is driven to rotate the upper belt 71 and the lower belt 72 at the same speed.

If the drive/stop button 32f is operated to the drive side in this state, the drive motor 83 is driven to intermittently rotate the rotary feeder 81 at the speed synchronized with the moving speed of the conveyor belt assembly 7. The sealed prepackaged foods P conveyed by the conveyor belt 85 (FIG. 12) of the previous operation step are successively fitted into the prepackaged food recesses 81a. Upon reaching the prepackaged food discharge port 84b by the rotation of the rotary feeder 81, the sealed prepackaged foods P are transferred to the lower belt 72 and conveyed to the downstream side thereby.

While being moved to the downstream side, the sealed prepackaged foods P are successively pressed by the sloped portion 44 of the upper belt 71 moving at the same speed as the lower belt 72, so that the sealed prepackaged foods P enter the heating space S defined downstream from the front pressing roller 71c while being uniformly pressed to have the same height. During their movements to the downstream side while being tightly held by the upper belt 71 and the lower belt 72, the sealed prepackaged foods P are heated to a predetermined temperature by being exposed to a high frequency electric field between the upper electrodes 61 and the lower electrodes 62 of the electrode assemblies 6. Consequently, the sealed prepackaged foods P are discharged from the downstream end of the conveyor belt assembly 7 to a next step (sterilization step of sterilizing the sealed prepackaged foods P by holding them at the heating temperature for a predetermined time) via the sealed unloading mechanism 8 at the discharge side.

As described above, in the high frequency sterilizing apparatuses 1, 1a, the sealed prepackaged foods P are tightly held by the high frequency electrodes in a highly pressurized atmosphere to apply a high frequency electric power for the sterilization of the sealed prepackaged foods P. Accordingly, the sealed prepackaged foods P can be quickly heated to 100° C. or higher, and the boiling of water contained in the sealed prepackaged foods P can be suppressed even if the sealed prepackaged foods P are heated to 100° C. or higher, securely preventing the packaging containers of the sealed prepackaged foods P from being broken or torn due to the boiling of water. This is considerably effective in improving work efficiency.

Figure 14:
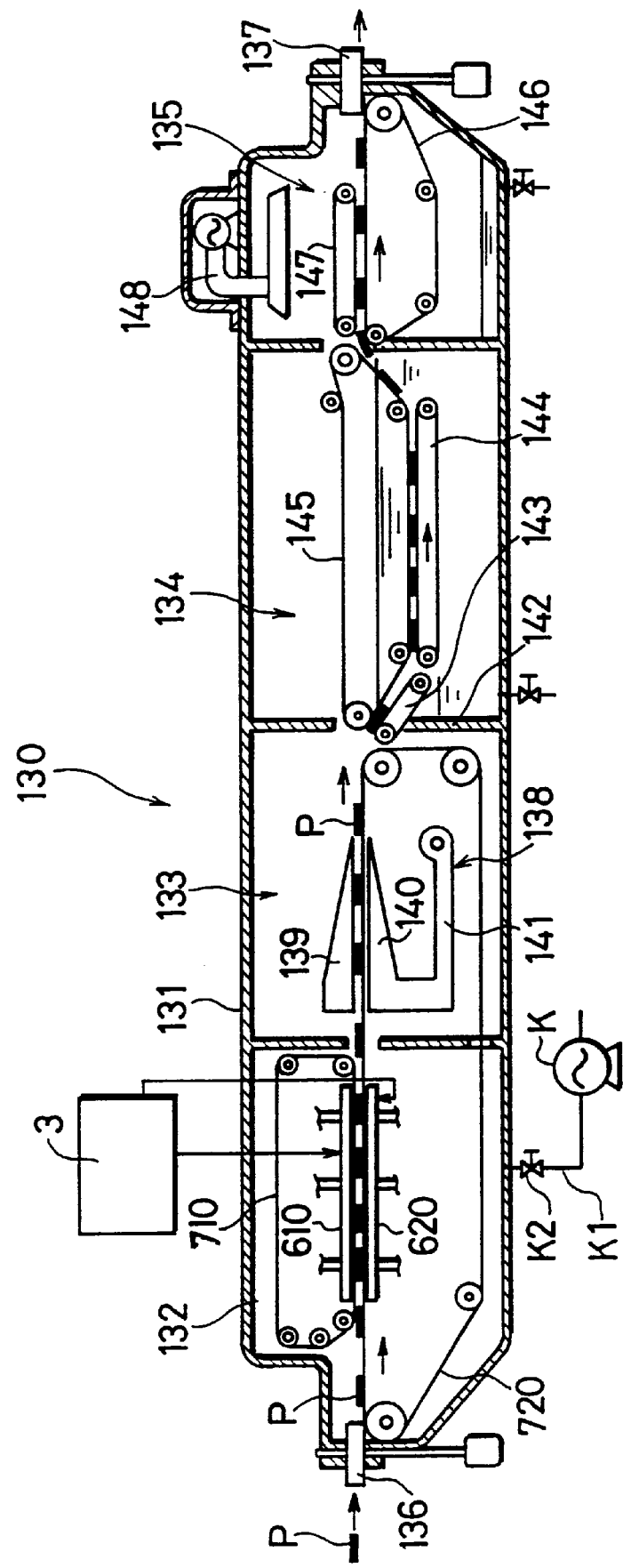
FIG. 14 is a diagram of a fifth high frequency sterilizing apparatus embodying the invention.

FIG. 14 is a fifth high frequency sterilizing apparatus. In this embodiment, a high frequency sterilizing apparatus 130 comprises a high pressure cylindrical body 131 which is a hollow cylindrical high pressure container. The inside of the high pressure cylindrical body 131 is partitioned by partition walls, thereby defining, from an upstream side (left side of FIG. 14), a high frequency heating unit 132 for heating sealed prepackaged foods P to 100° C. or higher by applying a high frequency electric power, a temperature maintaining unit 133 for maintaining the temperature of the heated sealed prepackaged foods P to apply a substantive heat sterilization, a cooling unit 134 for cooling the sterilized sealed prepackaged foods P, and a drying unit 135 for drying the packaging containers of the sealed prepackaged foods P. Coolant is stored in the cooling unit 134, and the sealed prepackaged foods P are cooled by being immersed in the coolant.

At an upstream end of the high pressure cylindrical body 131 is provided a rotary feeder 136 for introducing the sealed prepackaged foods P into the cylindrical body 131 while maintaining a highly pressurized state therein. A similar rotary feeder 137 is provided at a downstream end of the cylindrical body 131 to discharge the sealed prepackaged foods P out of the apparatus 130 while maintaining the highly pressurized state in the cylindrical body 131. The rotary feeders 136, 137 have the same construction as the rotary feeder 81 of the fourth embodiment.

In a specified position of the cylindrical body 131 is provided a compressed air pipe K1 for introducing a compressed air from a compressor K into the cylindrical body 131. By activating the compressor K when a valve K2 provided in the compressed air pipe K1 is open, the inside of the cylindrical body 131 can be held in a highly pressurized state.

In lower parts of the high frequency heating unit 132 and the temperature maintaining unit 133 is provided a lower belt 720 of a meshed material which is fitted on a plurality of rollers and rotated by an unillustrated driver. Further, in an upper part of the high frequency heating unit 132 is provided an upper belt 710 which faces a conveyance surface of the lower belt 720 and is rotated at the same speed as the lower belt 720 in synchronism with the lower belt 720. A heating space for heating the sealed prepackaged foods P by a high frequency electric power is defined between the upper belt 710 and the lower belt 720.

An upper electrode 610 is so disposed as to be in slidable contact with the underside of a forward moving part of the upper belt 710, whereas a lower electrode 620 is so disposed as to be in slidable contact with the underside of a forward moving part of the lower belt 720. On the other hand, a high frequency electric power generating unit 3 is provided in the vicinity of the high frequency sterilizing apparatus 130 to supply a high frequency electric power to the upper electrode 610 and the lower electrode 620. The other construction of the high frequency heating unit 132 is similar to that of the first embodiment.

The sealed prepackaged foods P introduced into the high frequency heating unit 132 from the outside via the rotary feeder 136 pass through the heating space defined between the upper electrode 610 and the lower electrode 620 while being tightly held by the upper belt 710 and the lower belt 720. While passing through the heating space, the sealed prepackaged foods P are heated by the high frequency electric power from the upper and lower electrodes 610, 620.

A temperature maintaining device 138 is provided in the temperature maintaining unit 133. This temperature maintaining device 138 includes upper and lower hoods 139, 140 and a hot air supplying device 141 for supplying a hot air to the lower hood 140. The hot air supplying device 141 includes a blower and an electric heater. The air inside the temperature maintaining unit 133 is introduced to the lower hood 140 by driving the blower, heated by the electric heater, collected into the upper hood 139 after passing through the lower belt 720 made of a meshed material, and consequently discharged outside the temperature maintaining unit 133. In this way, the air within the temperature maintaining unit 133 can be circulated by the temperature maintaining device 138.

Accordingly, the sealed prepackaged foods P having been heated to 100° C. or higher and discharged from the high frequency heating unit 132 are warmed by the hot air from the lower hood 140 so as to suppress a temperature fall thereof while passing a clearance between the upper hood 139 and the lower hood 140. While the sealed prepackaged foods P are passing the temperature maintaining unit 133, the heating temperature attained in the high frequency heating unit 132 is maintained. The sealed prepackaged foods P are substantively sterilized while the heating temperature is maintained.

Below the cooling unit 134 is formed a water tank 142 for storing the coolant. In the water tank 142 are provided a guide belt 143 whose upstream end faces the downstream end of the lower belt 720 and whose downstream end is underwater, an underwater belt 144 connected with the guide belt 143 and extending in a conveyance direction of the sealed prepackaged foods P in the coolant, and a pressing belt 145 which is so arranged as to form a pressing surface facing the conveyance surfaces of the guide belt 143 and the underwater belt 144. The respective belts 143, 144 and 145 are synchronized to rotate at the same speed.

A passage space for permitting the passage of sealed prepackaged foods P is defined between the conveyance surfaces of the guide belt 143 and the underwater belt 144 and the pressing surface of the pressing belt 145. Accordingly, the sealed prepackaged foods P dispensed from the downstream end of the lower belt 720 of the temperature maintaining unit 133 are guided into the coolant while being pressed by the pressing belt 145. In the coolant, the sealed prepackaged foods P are transferred to the underwater belt 144 and cooled while moving in the coolant.

The drying unit 135 is internally provided with a water draining belt 146 of a meshed construction and a pressing belt of a meshed construction provided above the water draining belt 146. A passage space for permitting the passage of the sealed prepackaged foods P is defined between a pressing surface of the pressing belt 147 and a conveyance surface of the water draining belt 146. The sealed prepackaged foods P discharged from the cooling unit 134 are conveyed to the rotary feeder 137 while being tightly held between the water draining belt 146 and the pressing belt 147.

A blowing device 148 is provided above the pressing belt 147. The sealed prepackaged foods P being conveyed by the water draining belt 146 are dried by air blown from the blowing device 148. The dried sealed prepackaged foods P are discharged to the outside of the apparatus 130 via the rotary feeder 137.

In the high frequency sterilizing apparatus 130 of the fifth embodiment, the sealed prepackaged foods P are successively introduced to the high frequency heating unit 132 via the upstream rotary feeder 136. The sealed prepackaged foods P introduced into the high frequency heating unit 132 are subjected to the high frequency electric power from the upper and lower electrodes 610, 620 while being tightly held by the upper and lower belts 710, 720, thereby being heated to 100° C. or higher. Subsequently in the temperature maintaining unit 133, the sealed prepackaged foods P are held at a temperature of 100° C. or higher by being subjected to a heat from the temperature maintaining device 138 while being conveyed by the lower belt 720 in order to be substantively sterilized. Subsequently in the cooling unit 134, the sealed prepackaged foods P are cooled by being immersed in the coolant while being conveyed by the respective belts 143, 144 and 145. Finally, the sealed prepackaged foods P are dried by being subjected to the air blown from the blowing device 148 while being conveyed by the water draining belt 146 and are discharged outside the apparatus 130 via the downstream rotary feeder 137.

Thus, according to the high frequency sterilizing apparatus 130 of the fifth embodiment, the high frequency heating, sterilization by maintaining the heating temperature, cooling and drying are continuously applied to the sealed prepackaged foods P. Accordingly, this apparatus 130 is suitable for the high speed heat sterilization of a large quantity of sealed prepackaged foods P and is effective in reducing operation costs.

The present invention is not limited to the foregoing embodiments described in detail above, but the following embodiments are also embraced by the scope thereof.

(1) In the foregoing embodiments, the present invention has been described with reference to the high frequency sterilizing apparatus. However, the present invention is not limited to the high frequency sterilizing apparatus, but is applicable to other sterilizing apparatus or heating apparatus for cooking.

(2) In the foregoing embodiments, the container main body 21 and the lid 22 are used as lower and upper high frequency electrodes. However, the invention is not limited to the constructions in which the container main body 21 and the lid 22 are used also as electrodes. Electrodes may be separately provided in the container main body 21 and the lid 22. With such an arrangement, for example, the container main body 21 and the lid 22 can be made of a non-conductive material such as a synthetic resin.

(3) Although the seal member 24 made of polytetrafluorethylene is used in the foregoing embodiments, synthetic resins such as a silicone rubber which has an excellent heat resistance and is tough may also be used.

(4) Although auxiliary heating to the sealed prepackaged foods P is performed after high frequency heating in the foregoing embodiments, the invention is not limited to the constructions in which auxiliary heating is performed after high frequency heating. Auxiliary heating may be performed before or simultaneously with high frequency heating.

(5) Although the inside of the food sterilization containers 2, 115, 123 is auxiliary heated by the steam from the steam generator, the outside thereof may be auxiliary heated instead of auxiliary heating the inside thereof. Further, heating means is not limited to steam, but may be heating by hot water, electric heating, heating using a Peltier device, chemical reaction heating, or any other suitable heating.

(6) Although the water from the coolant supply source 52 is admitted into the food sterilization containers 2, 115, 123 to cool them in the foregoing embodiments, the food sterilization container may be externally cooled instead of having the inside thereof directly cooled. Further, instead of water, freon, ammonia or other cooling medium having a better heat absorbing efficiency than water may be used as a cooling medium. Such a cooling medium is cooled again by its adiabatic expansion after the heat absorption so as to be used as a cooling source in a recycling manner.

(7) Although the food sterilization container 2 of fixed type is used in the foregoing embodiments, a vibrating mechanism may be additionally provided to vibrate the food sterilization container 2 with the sealed prepackaged foods P sealably loaded in the sterilization chamber 23. With this arrangement, the food inside the sealed prepackaged foods P is mixed so that the sealed prepackaged foods P can be more uniformly heated.

(8) Although the position of the food sterilization container 2 is changed by driving the drive motor 14 in the foregoing embodiments, an actuator such as a hydraulic cylinder may be used instead of the drive motor 14 to change the position of the food sterilization container 2.

(9) Although the belts 71, 72 are driven by one drive motor 73 in the foregoing embodiments, two drive motors may be separately provided for the belts 71, 72.

(10) Although the vertical dimension of the heating space S is changed by moving the upper electrodes 61 upward and downward in the foregoing embodiments, the lower electrodes 62 may be moved upward and downward or both lower and upper electrodes 61, 62 may be moved upward and downward.

(11) In the foregoing embodiments, the sealed loading and unloading mechanisms 8 are provided at the upstream and downstream ends of the casing 101 to seal the inside of the casing 101, and each mechanism 8 is provided with the rotary feeder 81 which rotates about the vertical axis 82. However, instead of using the rotary feeder 81, a double door whose outer and inner doors are not simultaneously openable may be adopted to ensure the sealability of the casing 101.

(12) Although the driving unit 135 is provided in the high pressure cylindrical body 131 in the foregoing embodiments, the rotary feeder 137 may be provided at the downstream end of the cooling unit 134 without particularly providing the drying unit 135. In such a case, the sealed prepackaged foods P are cooled after being discharged from the high pressure cylindrical body 131.

As described above, the heating apparatus is provided with a heater for heating a prepackaged food, an enclosure for defining airtight chamber operable to accommodate the prepackaged food, and a pressure controller for controlling the inside pressure of the airtight chamber. Accordingly, the inside pressure of the airtight chamber is controlled in response to an expansion of the prepackaged food being heated to prevent the packaging container from breaking.

The heater is constructed by the pair of electrodes arranged face to face, and an electric power source for supplying a high frequency electric power. This will heat the prepackaged food for a shorter period.

The airtight chamber is defined by the insulating side wall member of the opposed electrodes. Accordingly, the sealed high frequency heating space can be easily formed.

Furthermore, by cooling the prepackaged food inside the airtight chamber by the cooler upon the completion of heating, the pressure inside the prepackaged foods which was held high by a high temperature falls. Accordingly, when the airtight chamber is opened, the packaging container of the prepackaged food is not broken or torn. Thus, this is effective in speeding up unloading of the prepackaged food from the airtight chamber after the completion of the heat sterilization. Further, by suddenly cooling the prepackaged foods after the completion of heating, the degradation of tastes and flavors of the foods can be suppressed.

Further, preheating of the airtight chamber by the auxiliary heater solves the problem residing in the prior art that the inside of the prepackaged foods is heated by the high frequency heating, but the portions thereof in contact with the opposed electrodes are cooled by the electrodes having a lower temperature, making a temperature distribution of the prepackaged foods nonuniform, which results in a failure in performing a secure heat sterilization within a short time. Thus, such an arrangement is effective in performing a quick heat sterilization.

Further, by increasing the temperature of the prepackaged food to a sterilization temperature by the high frequency heating and then holding the sterilization temperature for a predetermined time using the auxiliary heater, the sterilization temperature can be easily and stably maintained. This is effective in efficiently performing heat sterilization. Further, by using the auxiliary heater together with the high frequency heating to increase the temperature of the prepackaged food, the prepackaged food can be uniformly heated while the temperature thereof is being increased.

Furthermore, the prepackaged food is successively introduced into the casing via the loading portion, conveyed between the opposed electrodes by the conveyor while being subjected to dielectric heating therebetween, and discharged outside the apparatus via the unloading portion. Accordingly, the prepackaged food can be continuously and quickly sterilized. This is convenient in applying heat sterilization to a large quantity of prepackaged foods in an industrial scale.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A heating apparatus for prepackaged foods comprising:
    a closed chamber in which said prepackaged foods are disposed:
    said closed chamber having two structural parts each forming an electrode, each of said electrodes having generally flat inner electrode faces which are parallel to and spaced from one another, said closed chamber having a height measured between said two spaced inner electrode faces and extending perpendicular to said two inner electrode faces, said height corresponding to the height of the prepackaged foods measured perpendicular to said two inner electrode faces such that the prepackaged foods disposed in said closed chamber are sandwiched between and in contact with said two spaced inner electrode faces;
    a pressure controller for controlling the pressure inside said closed chamber; and
    high frequency electric power generating apparatus connected to said electrodes such that said electrodes are operable to heat said prepackaged foods in said closed chamber.

2. A heating apparatus for prepackaged foods according to claim 1 further comprising an auxiliary heater in said closed chamber for heating said prepackaged foods in said closed chamber after said prepackaged foods have been heated by said high frequency electric power generating apparatus.

3. A heating apparatus for prepackaged foods according to claim 1 further comprising a cooler for cooling said prepackaged foods in said closed chamber.

4. A heating apparatus for prepackaged foods according to claim 1 wherein said prepackaged foods are heated in said closed chamber to a temperature of at least 100 degrees Centigrade to effect heat sterilization of said prepackaged foods.

5. A heating apparatus for prepackaged foods according to claim 8 wherein said two electrodes are operable to press said prepackaged food in said space between said two spaced inner electrode faces.

6. Apparatus for heating prepackaged foods comprising:
    a structure unit which includes a main body and a lid;
    said structure unit having a closed position in which said main body and said lid are disposed in a first relative position juxtaposed to one another to form a closed chamber for said prepackaged foods;
    said structure unit having an open position in which said main body and said lid are disposed in a second relation position displaced from said first relative position to form an open chamber which enables placement and removal of said prepackaged foods from said open chamber;
    a mechanism for moving said structure unit between said open and closed positions;
    a pressure controller for controlling the pressure in said closed chamber; and
    a high frequency electric power generating apparatus for heating said prepackaged foods in said closed chamber, said high frequency electrode generating apparatus including electrodes, said main body and said lid being made of metal and constituting said electrodes.

7. Apparatus for heating prepackaged foods according to claim 6 further comprising a heat exchanger for exchanging heat with the prepackaged foods in said closed chamber after the prepackaged foods have been initially heated by said high frequency electric power generating apparatus.

8. Apparatus for heating prepackaged foods according to claim 7 wherein said main body is designated a main body sub-unit and said lid is designated a lid sub-unit, said heat exchanger including heat exchange conduits in at least one of said sub-units.

9. Apparatus for heating prepackaged foods according to claim 8 wherein said heat exchange conduits are embedded within a least one of said sub-units.

10. Apparatus for heating prepackaged foods according to claim 7 wherein said heat exchanger heats said prepackaged foods to maintain the temperature of the prepackaged foods in said closed chamber.

11. Apparatus for heating prepackaged foods according to claim 7 wherein said heat exchanger cools said prepackaged foods in said closed chamber prior to removal of prepackaged foods from said closed chamber.

12. Apparatus for heating prepackaged foods according to claim 6 wherein said structure unit includes an insulating seal between said main body and said lid to insulate said main body and said lid and to seal said closed chamber.

13. Apparatus for heating prepackaged foods according to claim 12 wherein said insulating seal electrically insulates said main body and said lid when in said closed position.

14. Apparatus for heating prepackaged foods according to claim 12 wherein said insulating seal includes a main seal element and a second seal element carried by said main seal element.

15. Apparatus for heating prepackaged foods according to claim 6 wherein said main body is designated a main body sub-unit and said lid is designated a lid sub-unit, said pressure controller including a conduit in one of said sub-units for conducting a pressurizing medium to said closed chamber, said conduit having an external part extending externally of said one sub-unit, and a pressure control valve in said external part of said conduit.

16. Apparatus for heating prepackaged foods according to claim 15 wherein said pressure controller further includes a vent conduit in one of said sub-units for venting said pressurizing medium in said closed chamber, and a control valve in said vent conduit.

17. Apparatus for heating prepackaged foods according to claim 6 wherein said main body and said lid have generally flat inner faces which are generally parallel to one another when in said closed position, said closed chamber having a height measured generally perpendicular to said generally flat inner faces, said height corresponding generally to the height of the prepackaged foods in said closed chamber.

18. Apparatus for heating prepackaged foods according to claim 6 wherein said structure unit comprises at least one partition plate between said main body and said lid, said partition plate being spaced from said main body to form a first space, said partition plate being spaced from said lid to form a second space, said prepackaged foods being disposed in each of said first and second spaces.

19. Apparatus for heating prepackaged foods according to claim 18 wherein said structure unit comprises an insulating seal between said main body and said lid, said insulating seal forming an outer boundary of said closed chamber, said partition plate being disposed within said outer boundary of said insulating seal.

20. Apparatus for heating prepackaged foods according to claim 18 further comprising a first insulating seal between said main body and said partition plate and a second insulating seal between said lid and said partition plate, said partition plate constituting another electrode of said high frequency electric power generating apparatus.

21. Apparatus for heating prepackaged foods according to claim 6 wherein said main body and said lid each have a generally overall flat configuration, and further comprising a rotary mechanism for rotating said structure unit between a first position in which said main body and lid are generally horizontally disposed and a second position in which said main body and lid are generally vertically disposed.

22. A heating apparatus for prepackaged foods comprising:
a closed chamber in which said prepackaged foods are disposed, said closed chamber being formed by two bodies and an insulating seal between said two bodies;
a pressure controller for controlling the pressure inside said closed chamber; and
high frequency electric power generating apparatus in said closed chamber for heating said prepackaged foods in said closed chamber, said high frequency electric power generating apparatus including spaced electrodes disposed on opposite sides of said prepackaged foods, said two bodies constituting said electrodes of said high frequency electric power generating apparatus.

23. A heating apparatus for prepackaged foods according to claim 22 wherein said two bodies each have a generally flat inner surface, said inner surfaces being generally parallel to one another, said closed chamber having one position in which said surfaces are generally horizontally disposed and another position in which said surfaces are generally vertically disposed.

24. A heating apparatus for prepackaged foods comprising:
a closed chamber in which said prepackaged foods are disposed;
said closed chamber having two structural parts each having generally flat inner faces which are parallel to and spaced from one another;
a compensation plate between said spaced inner faces, said closed chamber having a height between one of said inner faces and said compensation plate extending perpendicular to said one inner face, said height corresponding to the height of the prepackaged foods in said closed chamber such that the prepackaged foods are sandwiched between and in contact with said one inner face and said compensation plate;
a pressure controller for controlling the pressure inside said closed chamber; and
high frequency electric power generating apparatus in said closed chamber for heating said prepackaged foods in said closed chamber, said high frequency electric power generating apparatus including spaced electrodes disposed on opposite sides of said prepackaged foods.

25. A heating apparatus for prepackaged foods comprising:
a closed chamber in which said prepackaged foods are disposed:
said closed chamber having two structural parts each having electrodes, said electrodes having inner generally flat electrode surfaces which are spaced from one another, said prepackaged foods being disposed between said inner electrode surfaces within a prepackaged food area, said inner electrode surfaces being in superimposed relationship with substantially all of said prepackaged foods in said prepackaged food area;
a pressure controller for controlling the pressure inside said closed chamber; and
high frequency electric power generating apparatus connected to said electrodes such that said electrodes are operable to heat said prepackaged foods in said closed chamber.

26. A method of heating prepackaged foods comprising:
providing two spaced electrodes each having generally flat electrode surfaces spaced from one another;
utilizing said two spaced electrodes to form at least part of a closed chamber;
disposing prepackaged foods in a sandwich relationship between the two spaced flat electrode surfaces of respective spaced electrodes in said closed chamber;
effecting contact between said prepackaged foods and said flat electrode surfaces of said respective spaced electrodes within said closed chamber;

providing a high frequency electric power generating apparatus and an operable connection between said high frequency electric power generating apparatus and said electrodes; and heating said prepackaged foods in said closed chamber utilizing said high frequency electric power generating apparatus and said electrodes with said contact between the prepackaged foods and said flat electrode surfaces in said closed chamber enhancing uniform heating of said prepackaged foods.

27. A method of heating prepackaged foods comprising:

disposing prepackaged foods and a compensation plate in a sandwich relationship between two spaced generally flat surfaces of respective structural members of a closed chamber;

effecting contact between said prepackaged foods and one of said flat surfaces, between said prepackaged foods and said compensation plate, and between said compensation plate and said other flat surface;

utilizing said two structural members as spaced electrodes of high frequency electric power generating apparatus; and heating said prepackaged foods in said closed chamber utilizing said high frequency electric power generating apparatus with said contact the prepackaged foods and said one flat surface and between said prepackaged foods and said compensation plate in said closed chamber enhancing uniform heating of said prepackaged foods.

28. A method according to claim 27 further comprising selecting a thickness of said compensation plate depending on varying thicknesses of said prepackaged food to provide said contact relationships between said prepackaged foods and said one flat surface, between said prepackaged foods and said compensation plate and between said compensation plate and said other flat surface while the distance between said two spaced flat surfaces remains constant.

29. A method of heating prepackaged foods comprising:

placing prepackaged foods within a prepackaged food area between two spaced inner surfaces of respective spaced structural members;

disposing a seal between said two spaced structural members such that said two spaced structural members in cooperation with said seal define a sealed closed chamber;

providing said structural members with inner surfaces of a size such that said spaced inner surfaces are in superimposed relationship with substantially all of said prepackaged foods within said prepackaged food area;

utilizing said two structural members and said inner surfaces of said structural members as spaced electrodes and as spaced electrode heating surfaces respectively of high-frequency electric power generating apparatus; and heating said prepackaged food in said closed chamber utilizing said electrodes and said spaced electrode heating surfaces.

\* \* \* \* \*